United States Patent
Harada et al.

(10) Patent No.: US 10,850,547 B2
(45) Date of Patent: Dec. 1, 2020

(54) POLYESTER FILM AND METHOD OF MANUFACTURING POLYESTER FILM

(71) Applicant: FUJIFILM CORPORATION, Tokyo (JP)

(72) Inventors: Kei Harada, Shizuoka (JP); Yuki Teshima, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/275,256

(22) Filed: Feb. 13, 2019

(65) Prior Publication Data

US 2019/0176503 A1 Jun. 13, 2019

Related U.S. Application Data

(63) Continuation of application No. PCT/JP2017/029403, filed on Aug. 15, 2017.

(30) Foreign Application Priority Data

Aug. 18, 2016 (JP) .................. 2016-160684

(51) Int. Cl.
*B41M 5/50* (2006.01)
*C08J 5/18* (2006.01)
(Continued)

(52) U.S. Cl.
CPC .......... *B41M 5/508* (2013.01); *B29C 55/005* (2013.01); *B29C 55/12* (2013.01); *B32B 27/36* (2013.01);
(Continued)

(58) Field of Classification Search
CPC .................................................. B41M 5/508
See application file for complete search history.

(56) References Cited

U.S. PATENT DOCUMENTS

2003/0054175 A1* 3/2003 Okajima ............. C09D 175/06
428/423.7
2007/0054141 A1 3/2007 Francis et al.
(Continued)

FOREIGN PATENT DOCUMENTS

CN 101605841 A 12/2009
EP 0824076 A1 2/1998
(Continued)

OTHER PUBLICATIONS

English language translation of the following: Office action dated Mar. 20, 2020 from the SIPO in a Chinese patent application No. 201780050398.1 corresponding to the instant patent application. This office action translation is submitted now in order to supplement the understanding of the cited references which are being disclosed in the instant Information Disclosure Statement.
(Continued)

*Primary Examiner* — Samir Shah
*Assistant Examiner* — Tong Guo
(74) *Attorney, Agent, or Firm* — SOLARIS Intellectual Property Group, PLLC

(57) ABSTRACT

Provided are a polyester film and a method of manufacturing the polyester film. A polyester film has a base film and at least one image receiving layer which is disposed on at least one surface of the base film, the base film contains a polyester and titanium oxide particles, the mass-based content of the titanium oxide particles in the base film satisfies Formula 1 on the assumption that the thickness of the base film is T μm, a surface roughness standard deviation Rq is 0.01 μm to 0.12 μm, a cross section in a thickness direction orthogonal to a plane direction of the base film has voids whose average area per void is 0.01 μm²/void to 0.10 μm²/void, and a surface roughness standard deviation Rq of
(Continued)

an outermost surface of the image receiving layer is 0.01 μm to 0.1 μm.

11 Claims, 2 Drawing Sheets

(51) Int. Cl.
  *C08K 3/22* (2006.01)
  *B32B 27/36* (2006.01)
  *C08L 67/00* (2006.01)
  *G03G 7/00* (2006.01)
  *B41M 5/00* (2006.01)
  *C08J 7/04* (2020.01)
  *B29C 55/00* (2006.01)
  *B29C 55/12* (2006.01)
  *B29K 67/00* (2006.01)
  *B29K 509/02* (2006.01)
  *B29L 9/00* (2006.01)

(52) U.S. Cl.
  CPC ............... *B41M 5/00* (2013.01); *C08J 5/18* (2013.01); *C08J 7/0427* (2020.01); *C08K 3/22* (2013.01); *C08L 67/00* (2013.01); *G03G 7/00* (2013.01); *G03G 7/008* (2013.01); *B29K 2067/00* (2013.01); *B29K 2509/02* (2013.01); *B29L 2009/005* (2013.01); *C08J 2367/02* (2013.01); *C08J 2423/00* (2013.01); *C08J 2433/04* (2013.01); *C08K 2003/2241* (2013.01); *C08K 2201/005* (2013.01)

(56) References Cited

U.S. PATENT DOCUMENTS

| 2010/0086736 | A1* | 4/2010 | Ueda ................ B32B 27/325 428/141 |
| 2012/0302676 | A1 | 11/2012 | Oya et al. |
| 2014/0340459 | A1* | 11/2014 | Fukunaga ............ B41M 5/42 347/171 |

FOREIGN PATENT DOCUMENTS

| EP | 0988966 A2 | 3/2000 |
| EP | 1114733 A1 | 7/2001 |
| JP | H01-9244 A | 1/1989 |
| JP | H03-261555 A | 11/1991 |
| JP | H04-30975 B2 | 5/1992 |
| JP | H10-329413 A | 12/1998 |
| JP | H11-977 A | 1/1999 |
| JP | 2000-135766 A | 5/2000 |
| JP | 2001-30350 A | 2/2001 |
| JP | 2001-504396 A | 4/2001 |
| WO | 2011/093478 A1 | 8/2011 |

OTHER PUBLICATIONS

International Search Report issued in International Application No. PCT/JP2017/029403 dated Oct. 24, 2017.
Written Opinion of the Isa issued in International Application No. PCT/JP2017/029403 dated Oct. 24, 2017.
Extended European Search Report dated Aug. 16, 2019, issued in corresponding EP Patent Application No. 17841516.2.
Office Action dated Jun. 25, 2019, issued by the JPO in corresponding Japanese Patent Application No. 2018-534405.

* cited by examiner

POLYESTER FILM AND METHOD OF MANUFACTURING POLYESTER FILM

CROSS-REFERENCE TO RELATED APPLICATION

This application is a continuation application of International Application No. PCT/JP2017/029403, filed Aug. 15, 2017, the disclosure of which is incorporated herein by reference in its entirety. Further, this application claims priority from Japanese Patent Application No. 2016-160684 filed on Aug. 18, 2016, the disclosure of which is incorporated herein by reference in its entirety.

BACKGROUND OF THE INVENTION

1. Field of the Invention

The present disclosure relates to a polyester film and a method of manufacturing the polyester film.

2. Description of the Related Art

In recent years, along with the spread of electrophotographic copying machines and various types of printers, forming an image on an image receiving sheet (hereinafter, may be simply referred to as "image receiving sheet" or "sheet") such as coated paper or a film coated with an image receiving layer containing a resin has been frequently performed to obtain a high-quality full color image.

Various image receiving sheets having an image receiving layer on a surface of a white base film have been proposed to form a full color image.

For example, a white polyester film having excellent light shielding properties and processability with an optical density of 0.5 or greater and a whiteness of 50% or greater, in which a specific amount of titanium dioxide having an average particle size of 0.1 to 0.6 μm is contained, and an easy-adhesion resin layer is laminated on at least one surface and has a specific surface specific resistance value and specific surface roughness has been proposed (see JP-H11-977A).

In addition, a white laminated polyester film having excellent printing properties and crease resistance, which is a white laminate having two white polyester layers which include fine bubbles (voids) and contain a thermoplastic resin incompatible with polyester under specific conditions has been disclosed (see JP2000-135766A).

Furthermore, a white polyester film containing fine titanium dioxide particles, silica particles, and a specific fluorescent whitening agent and having good whiteness and glossiness has been proposed (see JP-H4-30975B).

SUMMARY OF THE INVENTION

From the viewpoint of forming a high-quality image, the image receiving sheet for image formation is required to have good whiteness and glossiness, and to further have good concealability.

In a case where the content of a white pigment in the base film is increased to improve the concealability, the surface roughness tends to decrease due to the outer shape of the particles, and thus the glossiness tends to decrease.

The white polyester film described in JP1999-000977A (JP-H11-000977A) has sufficient whiteness. However, it has large surface roughness, and its glossiness, particularly, glossiness in a case where the incidence angle is small, for example, 60° is not sufficient, whereby there is a problem in appearance.

The white laminated polyester film described in JP2000-135766A is defined to have specific voids for the purpose of improving cushioning properties and heat insulating properties in order to improve printing characteristics by a thermal head. However, details of the type or content of the white pigment have not been examined, and there is still room for improvement in terms of balance between the whiteness and the glossiness.

In the white polyester film described in JP1992-030975B (JP-H4-030975B), a fluorescent paint is used to improve the whiteness, and the glossiness, particularly, the glossiness during light irradiation at a sharp angle such as 20° is insufficient.

An object of an embodiment of the present disclosure is to provide a polyester film having good whiteness, glossiness, and concealability.

An object of another embodiment of the present disclosure is to provide a method of manufacturing a polyester film having good whiteness, glossiness, and concealability.

Means for achieving the objects includes the following embodiments.

<1> A polyester film comprising: a base film; and at least one image receiving layer which is disposed on at least one surface of the base film, in which the base film contains a polyester and titanium oxide particles, the mass-based content of the titanium oxide particles in the base film satisfies Formulae 1-1 and 1-2 on the assumption that the thickness of the base film is $T^1$ μm, a surface roughness standard deviation Rq of a surface of the base film on which the image receiving layer is disposed is 0.01 μm to 0.12 μm, a cross section in a thickness direction orthogonal to a plane direction of the base film has voids whose average area per void is 0.01 μm²/void to 0.10 μm²/void, and a surface roughness standard deviation Rq of an outermost surface of the image receiving layer is 0.01 μm to 0.1 μm.

Hereinafter, the surface roughness standard deviation Rq of the surface of the base film on which the image receiving layer is disposed may be referred to as Rq (0), and the surface roughness standard deviation Rq of the outermost surface of the image receiving layer may be referred to as Rq (1).

$1200/T^1 \leq$ Content of Titanium Oxide Particles in Base Film $\leq 600/T^1 + 16$ \hfill Formula 1-1

$40 \leq T^1 \leq 400$ \hfill Formula 1-2

<2> The polyester film according to <1>, in which the mass-based content of the titanium oxide particles in the base film satisfies Formulae 2-1 and 2-2 on the assumption that the thickness of the base film is $T^2$ μm.

$1200/T^2 + 1 \leq$ Content of Titanium Oxide Particles in Base Film $\leq 600/T^2 + 12$ \hfill Formula 2-1

$60 \leq T^2 \leq 400$ \hfill Formula 2-2

<3> The polyester film according to <1> or <2>, in which the titanium oxide particles contained in the base film have an average particle size of 0.03 μm to 0.35 μm.

<4> The polyester film according to any one of <1> to <3>, in which the titanium oxide particles contained in the base film have an average particle size of 0.1 μm to 0.3 μm.

<5> The polyester film according to any one of <1> to <4>, in which the image receiving layer contains particles, and an average minor axis of the particles contained in an amount of 40 mass % or greater in the image receiving layer is 0.005 μm to 0.2 μm.

<6> The polyester film according to any one of <1> to <5>, in which the base film has a thickness of 100 μm to 300 μm.

<7> The polyester film according to any one of <1> to <6>, in which an optical density is 0.5 or greater.

<8> The polyester film according to any one of <1> to <7>, in which a whiteness measured from the image receiving layer side is 50% or greater.

<9> The polyester film according to any one of <1> to <8>, in which the image receiving layer has a thickness of 2 μm to 6 μm.

<10> The polyester film according to any one of <1> to <9>, which is an image receiving sheet.

<11> A method of manufacturing a polyester film comprising the steps of: forming a base film which is biaxially stretched at least 12 times in area magnification by subjecting an un-stretched polyester film containing a polyester and titanium oxide particles and having an intrinsic viscosity of 0.70 dL/g to 0.90 dL/g to longitudinal stretching in a length direction and lateral stretching in a width direction; and forming an image receiving layer by coating at least one surface of the obtained base film with a coating liquid for forming an image receiving layer.

According to an embodiment of the present disclosure, it is possible to provide a polyester film having good whiteness, glossiness, and concealability.

According to another embodiment of the present disclosure, it is possible to provide a method of manufacturing a polyester film having good whiteness, glossiness, and concealability.

DESCRIPTION OF THE PREFERRED EMBODIMENTS

Figure 1:
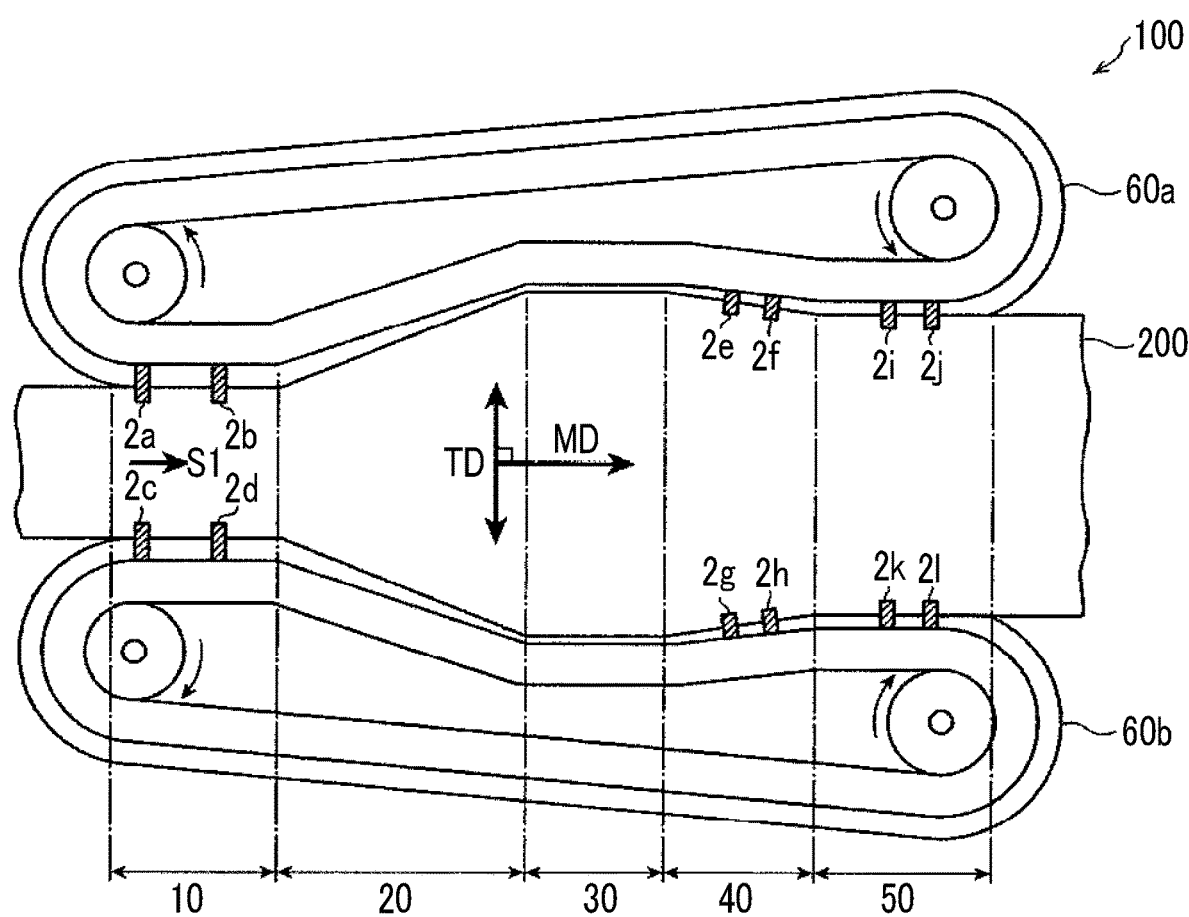
FIG. 1 is a schematic diagram showing an example of a biaxial stretching machine which is used in the manufacturing of a stretched white polyester film according to the embodiment of the present disclosure.

Hereinafter, embodiments of the present disclosure will be described, but the following embodiments are merely examples, and the present disclosure is not limited to the following embodiments.

In the specification of this application, the expression "to" indicating a numerical value range is used to mean a range including numerical values before and after "to" as a lower limit value and an upper limit value. In addition, in a case where a unit is described only for the upper limit value or for the lower limit value in a numerical range, this means that the unit of the lower limit value is the same as that of the upper limit value.

In the present specification, in numerical value ranges described in stages, the upper limit value or the lower limit value described in one numerical value range may be replaced with the upper limit value or the lower limit value of other numerical value ranges described in stages. In addition, in a numerical value range described in the present specification, the upper limit value or the lower limit value of the numerical value range may be replaced with the values shown in examples.

In the present specification, in referring to the amount of a component in a composition, in a case where plural substances exist corresponding to a component in the composition, the amount means, unless otherwise specified, the total amount of the plural substances existing in the composition.

In the present specification, the term "step" includes not only an independent step, but also a step in which the expected purpose of this step is achieved, even if the step cannot be clearly differentiated from the other steps.

In the present specification, the thickness of a sheet-like material having a sheet form such as a polyester film or a base film refers to a thickness in a cross section in a direction orthogonal to a plane direction of the sheet-like material, unless otherwise specified.

[Polyester Film]

A polyester film according to the embodiment of the present disclosure is a polyester film which has a base film and at least one image receiving layer disposed on at least one surface of the base film, and in which the base film contains a polyester and titanium oxide particles, the mass-based content of the titanium oxide particles in the base film satisfies Formulae 1-1 and 1-2 on the assumption that the thickness of the base film is $T^1$ μm, a surface roughness standard deviation Rq of a surface of the base film on which the image receiving layer is disposed is 0.01 μm to 0.12 μm, a cross section in a thickness direction orthogonal to a plane direction of the base film has voids whose average area per void is 0.01 μm²/void to 0.10 μm²/void, and a surface roughness standard deviation Rq of an outermost surface of the image receiving layer is 0.01 μm to 0.1 μm.

$1200/T^1 \leq$ Content of Titanium Oxide Particles in Base Film $\leq 600/T^1 + 16$    Formula 1-1

$40 \leq T^1 \leq 400$    Formula 1-2

Hereinafter, the polyester film according to the embodiment of the present disclosure may be simply referred to as "film".

The polyester film according to the embodiment of the present disclosure has excellent whiteness, glossiness, and concealability. The reason for this is presumed as follows.

The base film of the polyester film according to the embodiment of the present disclosure contains a polyester and titanium oxide particles, and the content of the titanium oxide particles in the base film is defined by Formulae 1-1 and 1-2. The content of the titanium oxide particles depends on the thickness of the base film and the concentration of the titanium oxide particles in the polyester.

In Formula 1-1, $(1200/T^1)$ represents a lower limit value of the preferable content of the titanium oxide particles in the base film, depending on the thickness of the base film, and $(600/T^1)+16$ represents an upper limit value of the preferable content of the titanium oxide particles.

In a case where the thickness of the base film is $T^1$ μm, the surface roughness of the surface of the base film is likely to be within a preferable range in a case where the content of the titanium oxide particles in the base film is not greater than $(600/T^1)+16$ mass %, whereby the glossiness is improved. In addition, the whiteness and the concealability are improved in a case where the content of the titanium oxide particles in the base film is $(1200/T^1)$ mass % or greater. Here, the lower limit value of the content of the titanium oxide particles varies depending on the thickness ($T^1$) of the base film. For example, it is thought that in a case where the base film has a large thickness, good whiteness and concealability are achieved even in a case where the mass-based content of the titanium oxide particles in the base film is small. It is thought that in a case where the thickness ($T^1$) of the base film is 400 µm or less, breakage hardly occurs even in a case where the film is stretched during the film formation, and thus a stretching ratio necessary for void formation can be secured, and it is also thought that in a case where the thickness is 40 µm or greater, good concealability can be obtained.

It is thought that there is a concern that voids generated by stretching in the base film, that is, fine bubbles reduce the film hardness depending on the size and the number of bubbles generated per unit area. The inventors have conducted intensive studies, and found that regarding voids in the base film, in a case where the average area per void is 0.010 µm²/void to 0.10 µm²/void in a cross section in the thickness direction orthogonal to the plane direction of the base film, the glossiness of the film, particularly, the glossiness with respect to the light incident at an incidence angle of 20° with respect to the film surface is improved in association with the function of the titanium oxide particles contained in the base film.

In consideration of the influence of voids existing in the base film on the base film, in a case where the average area per void is 0.01 µm²/void or greater in a cross section in the thickness direction of the base film, the whiteness and the concealability are improved due to an improvement in internal optical reflectivity of the base film. In a case where the average area per void is 0.10 µm²/void or less, the number of large voids existing in the base film is not large, and similarly, the whiteness and the concealability are improved due to an improvement in internal optical reflectivity of the base film.

Furthermore, the formation of voids having the above-described size means that the film is stretched under appropriate conditions during the formation of the base film, and as a result, the size of the voids is within an appropriate range, and secondary effects such as an improvement in hardness of the base film by stretching and suppression of cleavage fracture of the base film can be obtained.

In the base film of the film according to the embodiment of the present disclosure, a surface roughness standard deviation Rq (0) of the surface on which the image receiving layer is disposed is 0.01 µm to 0.12 µm, and thus a surface roughness standard deviation Rq (1) of the outermost surface of the image receiving layer formed on at least one surface of the base film is easily adjusted to be within a range of 0.01 µm to 0.1 µm. The outermost surface of the image receiving layer serves as an image forming surface of the film. Accordingly, it is thought that in a case where the surface roughness standard deviation Rq (1) of the outermost surface of the film is within a range of 0.01 µm to 0.1 µm, the glossiness of the outermost surface of the film is improved, the appearance is improved, and the image quality of an image to be formed increases.

The film and the method of manufacturing a film according to the embodiment of the present disclosure are not limited to the above-described estimated mechanisms at all.

[Base Film]

The base film of the film according to the embodiment of the present disclosure contains at least a polyester and titanium oxide particles.

(Polyester)

The type of the polyester contained in the base film of the polyester film according to the embodiment of the present disclosure is not particularly limited, and a known polyester can be used.

Examples of the polyester contained in the base film include a linear saturated polyester which is synthesized from an aromatic dibasic acid or an ester-forming derivative thereof and a diol or an ester-forming derivative thereof. Specific examples of the linear saturated polyester include polyethylene terephthalate (PET), polyethylene isophthalate, polybutylene terephthalate, poly(1,4-cyclohexylene dimethylene terephthalate), and polyethylene-2,6-naphthalate (PEN). Among these, polyethylene terephthalate, polyethylene-2,6-naphthalate, poly(1,4-cyclohexylene dimethylene terephthalate), and the like are particularly preferable as the linear saturated polyester in view of balance between mechanical properties and cost.

The polyester may be a homopolymer or a copolymer.

The base film may contain, as a resin component, a resin other than the polyester in addition to the polyester as long as the effects of the embodiment of the present disclosure are not impaired. Examples of other resins include a polycarbonate.

In a case where other resins are contained, the amount thereof is preferably 3 mass % or less with respect to the total amount of the resins contained in the base. In a case where other resins are further contained in the polyester resin, a known compatibilizer or the like may be used to prepare a homogeneous polymer blend.

The type of the polyester is not limited to the exemplified polyesters described above, and other polyesters may be used. For example, a polyester synthesized using a dicarboxylic acid component and a diol component may be used. A commercially available polyester may also be used.

Examples of the method of synthesizing a polyester include a method of subjecting (a) dicarboxylic acid component and (b) diol component to at least one of an esterification reaction or a transesterification reaction by a known method.

Examples of (a) dicarboxylic acid component include dicarboxylic acids such as aliphatic dicarboxylic acids, e.g., malonic acid, succinic acid, glutaric acid, adipic acid, suberic acid, sebacic acid, dodecanedioic acid, dimer acid, eicosanedioic acid, pimelic acid, azelaic acid, methylmalonic acid, and ethyl malonic acid; alicyclic dicarboxylic acids, e.g., adamantane dicarboxylic acid, norbornene dicarboxylic acid, cyclohexane dicarboxylic acid, and decalin dicarboxylic acid; and aromatic dicarboxylic acids, e.g., terephthalic acid, isophthalic acid, phthalic acid, 1,4-naphthalene dicarboxylic acid, 1,5-naphthalene dicarboxylic acid, 2,6-naphthalene dicarboxylic acid, 1,8-naphthalene dicarboxylic acid, 4,4'-diphenyl dicarboxylic acid, 4,4'-diphenyl ether dicarboxylic acid, 5-sodium sulfoisophthalic acid, phenylindane dicarboxylic acid, anthracene dicarboxylic acid, phenanthrene dicarboxylic acid, and 9,9'-bis(4-carboxyphenyl)fluorene acid, and ester derivatives thereof.

Examples of (b) diol component include diol compounds such as aliphatic diols, e.g., ethylene glycol, 1,2-propanediol, 1,3-propanediol, 1,4-butanediol, 1,2-butanediol, and 1,3-butanediol; alicyclic diols, e.g., cyclohexane dimethanol, spiroglycol, and isosorbide; and aromatic diols such as bisphenol A, 1,3-benzene dimethanol, 1,4-benzene dimethanol, and 9,9'-bis(4-hydroxyphenyl)fluorene.

At least one aromatic dicarboxylic acid is preferably used as (a) dicarboxylic acid component. More preferably, an aromatic dicarboxylic acid is contained as a main component in the dicarboxylic acid component. Here, the "main component" means that the proportion of an aromatic dicarboxylic acid in the dicarboxylic acid component is 80 mass % or greater. A dicarboxylic acid component other than the aromatic dicarboxylic acid may be contained. Examples of such a dicarboxylic acid component include ester derivatives of aromatic dicarboxylic acids.

At least one aliphatic diol is preferably used as (b) diol component. As the aliphatic diol, for example, an ethylene glycol may be contained, and an ethylene glycol may be preferably contained as a main component. Here, the main component means that the proportion of an ethylene glycol in the diol component is 80 mass % or greater.

The amount of the aliphatic diol (for example, ethylene glycol) to be used is preferably within a range of 1.015 to 1.50 mol with respect to 1 mol of the aromatic dicarboxylic acid (for example, terephthalic acid) and an optional ester derivative thereof. The amount of the aliphatic diol to be used is more preferably within a range of 1.02 to 1.30 mol, and even more preferably 1.025 to 1.10 mol. In a case where the amount of the aliphatic diol to be used is within a range of 1.015 mol or greater, the esterification reaction favorably proceeds. In a case where the amount of the aliphatic diol to be used is within a range of 1.50 mol or less, the generation of a diethylene glycol caused by dimerization of an ethylene glycol is suppressed, and thus a large number of characteristics, such as melting point, glass transition temperature, crystallinity, heat resistance, hydrolysis resistance, and weather fastness, can be favorably maintained.

A known reaction catalyst can be used for the esterification reaction or the transesterification reaction.

Examples of the reaction catalyst include alkali metal compounds, alkaline earth metal compounds, zinc compounds, lead compounds, manganese compounds, cobalt compounds, aluminum compounds, antimony compounds, titanium compounds, and phosphorus compounds. In general, in an arbitrary stage before completion of the manufacturing of a polyester, an antimony compound, a germanium compound, a titanium compound, or the like is preferably added as a polymerization catalyst. As such a method, in a case where a germanium compound is taken as an example, it is preferable to add a germanium compound powder as it is in an arbitrary stage before completion of the manufacturing of a polyester.

In the preparation of a base film using the polyester synthesized as described above, a known additive such as a light stabilizer, an antioxidant, an ultraviolet absorber, a flame retardant, a lubricant such as fine particles, a nucleating agent as a crystallizing agent, a crystallization inhibitor, a terminal blocking agent, or the like may be further contained depending on the purpose. The weather fastness, hydrolysis resistance, and the like of a polyester film to be obtained can be improved in a case where a terminal blocking agent is kneaded and directly reacted with polyester molecules in the manufacturing of the polyester film.

(Titanium Oxide Particles)

The base film contains titanium oxide particles.

In a case where the base film contains titanium oxide particles, the light reflecting properties of the base film is improved. In addition, the base film exhibits excellent durability even under light irradiation, and the whiteness and the glossiness are improved.

A titanium oxide includes a rutile type and an anatase type. The base film preferably contains titanium oxide particles composed mainly of a rutile type. The rutile type titanium oxide has a characteristic in that it has a very high ultraviolet spectral reflectivity, whereas the anatase type titanium oxide has a characteristic in that it has a high ultraviolet absorbance (low spectral reflectivity).

In a case where the ultraviolet absorbing performance of a rutile type titanium oxide is used in consideration of the difference in spectral characteristics in the crystal form of the titanium oxide, the polyester film according to the embodiment of the present disclosure has improved light resistance, that is, durability against degradation due to ultraviolet exposure. Accordingly, for example, even in a case where other ultraviolet absorbers are not substantially added to the base film, the film durability under light irradiation is excellent, and thus contamination and a reduction in adhesion to the image receiving layer to be described later, caused by bleed out of the ultraviolet absorber that may occur in a case where the ultraviolet absorber is added, do not easily occur.

As described above, the titanium oxide particles according to the present disclosure are preferably composed mainly of a rutile type, and the "mainly" mentioned herein means that the amount of the rutile type titanium oxide in the entire titanium oxide particles is greater than 50 mass %.

In addition, the content of the anatase type titanium oxide in the entire titanium oxide particles is preferably 10 mass % or less. The content is more preferably 5 mass % or less, and particularly preferably 0 mass %. The rutile type titanium oxide and the anatase type titanium oxide can be distinguished from each other by X-ray structure diffraction or spectral absorption characteristics.

More specifically, a sample of titanium oxide is prepared, an EELS spectrum obtained by electron energy loss spectroscopy (EELS) is compared with standard spectra of a rutile type titanium oxide and an anatase type titanium oxide, and thus the rutile type titanium oxide and the anatase type titanium oxide can be distinguished from each other. That is, the rutile type titanium oxide and the anatase type titanium oxide can be distinguished from each other by comparison of the same energy levels (eV) at which a peak exists even with different peak intensities.

As the titanium oxide particles, non-treated titanium oxide particles, surface-treated silica particles whose surface is treated with an inorganic material such as alumina, silica, or the like, or surface-treated silica particles subjected to a surface treatment with an organic material such as silicone, alcohol, or the like may be used.

In the preparation of the base film, particle size adjustment or removal of coarse particles may be performed on the titanium oxide particles using a purifying process before the titanium oxide particles are blended into the polyester. Examples of the purifying process of the titanium oxide particles include a method including: pulverizing titanium oxide particles by pulverizing means; and obtaining titanium oxide particles having a desired particle size by classifying means. The particle size adjustment or removal of coarse particles can be performed through the above-described purifying process.

Known pulverizing means such as a jet mill or a ball mill can be applied as the pulverizing means for the purifying process. Known classifying means such as a dry type or wet type centrifugal separator can be applied as the classifying means.

The base film may contain only one type of titanium oxide particles, or two or more types of titanium oxide particles. In a case where two or more types of titanium oxides are contained, examples of the contained particles include a combination of particles having different particle sizes, a combination of titanium oxide particles having different compositions, a combination of particles subjected to different surface treatments, and a combination of surface-treated particles and non-surface-treated particles. The combination of two or more types of titanium oxide particles is not limited to the above examples.

The base film may contain white particles other than the titanium oxide particles as long as the effects of the embodiment of the present disclosure are not impaired. The white particles other than the titanium oxide particles will be described later.

The mass-based content of the titanium oxide particles in the base film satisfies Formulae 1-1 and 1-2 on the assumption that the thickness of the base film is $T^1$ µm. That is, this means that the thickness $T^1$ (µm) of the base film is within the range shown in Formula 1-2, and the content (mass %) of the titanium oxide particles with respect to the total solid content of the base film is [not less than $(1,200/T^1)$] and [not greater than $(600/T^1)+16$].

$1200/T^1 \leq$ Content of Titanium Oxide Particles in Base Film $\leq 600/T^1+16$  Formula 1-1

$40 \leq T^1 \leq 400$  Formula 1-2

In addition, the mass-based content of the titanium oxide particles in the base film preferably satisfies Formulae 2-1 and 2-2 on the assumption that the thickness of the base film is $T^2$ µm. That is, it is preferable that under conditions where Formulae 1-1 and 1-2 are satisfied, the thickness $T^2$ (µm) of the base film is within the range shown in Formula 2-2, and the content (mass %) of the titanium oxide particles with respect to the total solid content is [not less than $(1,200/T^2)+1$] and [not greater than $(600/T^2)+12$].

$1200/T^2+1 \leq$ Content of Titanium Oxide Particles in Base Film $\leq 600/T^2+12$  Formula 2-1

$60 \leq T^2 \leq 400$  Formula 2-2

For example, in a case where the thickness of the base film is 60 µm, the content of the titanium oxide particles contained in the base film is 20 mass % to 26 mass %, and preferably within a range of 21 mass % to 22 mass %. In a case where the thickness of the base film is 100 µm, the content of the titanium oxide particles contained in the base film is 12 mass % to 22 mass %, and preferably within a range of 13 mass % to 18 mass %. In a case where the thickness of the base film is 400 µm, the content of the titanium oxide particles contained in the base film is 3 mass % to 17.5 mass %, and preferably within a range of 4 mass % to 13.5 mass %.

The content of the titanium oxide particles contained in the base film can be measured by the following method.

3 g of a film as a measurement sample is placed in a crucible, and heated in an electric oven at 900° C. for 120 minutes. After that, the inside of the electric oven is cooled, and then the crucible is taken out. The mass of the ash remaining in the crucible is measured. The ash content is the titanium oxide particle content, and a value obtained by multiplying by 100 a value obtained by dividing the mass of the ash by the mass of the measurement sample is defined as the content (mass %) of the particles.

Before the manufacturing of the film, the content may be obtained from the amount of the titanium oxide particles to be added and used as a raw material.

The average particle size of the titanium oxide particles contained in the base film is preferably 0.03 µm to 0.35 µm, more preferably 0.1 µm to 0.3 µm, and even more preferably 0.2 µm to 0.25 µm.

In a case where the average particle size of the titanium oxide particles is within the above-described range, the whiteness of the base film is improved, and preferable voids to be described later in a cross section of the film, derived from the titanium oxide particles, are more easily formed. In a case where the average particle size of the titanium oxide particles is 0.1 µm or greater, the concealability of the base film is also improved.

(Method of Measuring Average Particle Size of Titanium Oxide Particles)

The average particle size of the titanium oxide particles contained in the base film can be obtained by a method using an electron microscope. Specifically, the following method is used.

Titanium oxide particles in a cross section in a thickness direction of a base film orthogonal to a plane direction of the base film are observed with a scanning electron microscope, and the magnification is appropriately changed according to the size of the particles to take an image. The image is copied in an enlarged size. In at least 200 particles selected randomly, the outer periphery of each particle is traced. The equivalent circle diameters of the particles are measured from the trace images by an image analyzer, and an average thereof is defined as the average particle size of the titanium oxide particles in the present specification.

Before the base film is manufactured, in at least 200 particles selected randomly from the titanium oxide particles to be used as a raw material, the average particle size may be obtained in the same manner as above.

As described above, the base film may contain white particles other than the titanium oxide particles in addition to the titanium oxide particles as long as the effects of the embodiment of the present disclosure are not impaired.

Examples of the white particles other than the titanium oxide particles which may be contained in the base film include wet silica, dry silica, colloidal silica, calcium carbonate, aluminum silicate, calcium phosphate, alumina, magnesium carbonate, zinc carbonate, zinc oxide (Chinese white), antimony oxide, cerium oxide, zirconium oxide, tin oxide, lanthanum oxide, magnesium oxide, barium carbonate, zinc carbonate, lead carbonate basic (lead white), barium sulfate, calcium sulfate, lead sulfate, zinc sulfate, mica, titanated mica, talc, clay, kaolin, lithium fluoride, and calcium fluoride.

Barium sulfate is preferable as the white particles other than the titanium oxide particles from the viewpoint of availability.

As in the case of the titanium oxide particles, surfaces of the white particles other than the titanium oxide particles to be used in combination may also be subjected to an inorganic treatment with alumina, silica, or the like, or an organic treatment with silicone, alcohol, or the like.

Examples of the white particles other than the titanium oxide particles further include white particles of an organic material in addition to the white particles of an inorganic material described above. As the white particles of an organic material, particles resistant to heat during the formation of the polyester film are preferable, and examples thereof include white particles made from a crosslinking type resin. More specific examples thereof include polystyrene particles crosslinked with divinylbenzene.

The content of the white particles other than the titanium oxide particles in the base film is preferably 1 mass % or less, more preferably 0.5 mass % or less, and even more preferably 0 mass % with respect to the total amount of the particles contained in the basic film. That is, even more preferable is an aspect in which the white particles other than the titanium oxide particles are not contained.

(Surface Roughness of Base Film)

A surface roughness standard deviation Rq (0) of the surface of the base film on which the image receiving layer is disposed is within a range of 0.01 μm to 0.12 μm. In a case where the surface roughness standard deviation Rq (0) of the surface of the base film on which the image receiving layer is disposed is within the above-described range, the polyester film according to the embodiment of the present disclosure in which the image receiving layer is formed on the base film has good glossiness.

In a case where the surface roughness standard deviation Rq (0) of the surface of the base film on which the image receiving layer is disposed is within a range of 0.01 μm to 0.12 μm, the influence of the surface roughness of the base film on the surface roughness of the image receiving layer formed on the surface of the base film can be suppressed. Therefore, it is thought that the image receiving layer formed on the surface of the base film also has excellent smoothness and imparts good glossiness to the film.

The surface roughness standard deviation Rq (0) of the surface of the base film on which the image receiving layer is disposed is 0.01 μm to 0.12 μm, preferably 0.01 μm to 0.10 μm, and more preferably 0.01 μm to 0.06 μm.

In the present specification, a value measured by the following method is used as the surface roughness standard deviation Rq (0) of the base film.

(Direct Analysis of Surface of Base Film)

The surface roughness standard deviation Rq (0) of the base film is measured using a surface roughness measuring instrument "SURFTEST-500" (trade name) manufactured by Mitutoyo Corporation under standard conditions of the device. The base film is scanned in a length direction (MD: Machine Direction) and in a width direction (TD: Transverse Direction), and the measurement is performed 5 times in each of the directions. The average of the obtained 10 numerical values is defined as the surface roughness standard deviation Rq (0) of the base film in the present specification.

The width direction is also called a cross direction (CD). In the present specification, hereinafter, the length direction of the film may be referred to as MD, and the width direction may be referred to as TD.

In a case where the above-described method of measuring a surface roughness standard deviation Rq (0) of the base film by direct analysis is applied to the polyester film in which the image receiving layer is formed on the surface of the base film, the image receiving layer is peeled or removed by dissolving to expose the surface of the base film. Thus, the measurement can be performed on the exposed surface of the base film in the same manner as in the above-described measurement method.

(Analysis in State in which Image Receiving Layer is Disposed)

In a case where it is difficult to expose the surface of the base film by peeling of the image receiving layer, the surface roughness standard deviation Rq (0) of the base film is measured by the following method.

The film is cut in the thickness direction along MD and TD of the film with a microtome to obtain a cross section.

Next, in the cross section, a cut surface in each of TD and MD at the interface between the image receiving layer and the base film is observed with a scanning electron microscope at a magnification of 200 times, and for each of TD and MD, 9 or more electron micrographs are randomly taken to obtain cross-sectional images of the polyester film.

A curve of the interface between the image receiving layer and the base film in the obtained cross-sectional image is digitized using image analysis software (Spectrum Converter) under the following conditions.

In this case, in a case where the interface between the image receiving layer and the base film is hardly seen, the image traced along the interface between the image receiving layer and the base film is processed by the image analysis software as necessary.

Evaluated Length: 1,250 μm

Sampling Pitch: 0.5 μm

From the image processing data obtained as described above, the surface roughness standard deviation Rq (0) of the base film is calculated.

With this procedure, scanning is performed in the film length direction (MD) and in the width direction (TD), and the measurement is performed 5 times in each of the directions. The average of the obtained 10 numerical values is defined as the surface roughness standard deviation Rq in the present specification.

(Voids)

The base film has voids (cavities) whose average area per void is 0.01 $\mu m^2$/void to 0.10 $\mu m^2$/void in a cross section in the thickness direction orthogonal to the plane direction of the base film.

Regarding the voids present in the base film, by stretching an un-stretched polyester film which forms the base film, the polyester is peeled from the titanium oxide particles at the interface with the titanium oxide particles by stretching, and thus the voids are formed in the vicinity of the titanium oxide particles.

That is, the fine voids (that is, cavities) present in the base film in the present disclosure are derived and formed mainly from the titanium oxide particles, and the voids derived from the titanium oxide particles refer to cavities present in the vicinity of the titanium oxide particles. The presence of voids can be confirmed by, for example, photographing the cross section of the base film with an electron microscope.

There are voids formed due to the formation of cavities in the vicinity of aggregates formed by aggregation of primary particles of two or more titanium oxide particles, and voids with no titanium oxide particles formed due to the separation of the titanium oxide particles from the base film during the observation of the cross section. In the present specification, the voids also include the above voids.

In the present specification, the area of a void in the cross section in the thickness direction includes a portion of the titanium oxide particles present in the cavity.

In a case where the average area per void present in the base film is 0.01 $\mu m^2$/void or greater, the reflection effect of light reaching the inside of the base film is obtained, and thus the whiteness and the glossiness are improved. Furthermore, the fact that the average area per void present in the base film is 0.01 $\mu m^2$/void or greater means that the base film is sufficiently stretched, and thus high weather resistance can be imparted to the base film. In addition, in a case where the average area per void is 0.10 $\mu m^2$/void or less, transmission of light reaching the inside of the base film is suppressed, and the reflection effect is obtained similarly. Accordingly, the whiteness and the glossiness of the base film are improved.

In a case where the average area per void is 0.10 $\mu m^2$/void or less, the amount of moisture intruding into the void is reduced even in a case where the base film is exposed to the outside air for a long period of time. Accordingly, hydrolysis of the base film is suppressed. Thus, even in a case where the polyester film according to the embodiment of the present disclosure is disposed at a position exposed to the outside air after image formation, it is possible to suppress the occurrence of cleavage fracture of the base film.

From such a viewpoint, the average area per void in a cross section in the thickness direction of the base film is 0.010 μm²/void to 0.10 μm²/void, and preferably 0.03 μm²/void to 0.10 μm²/void.

The proportion of the total area (area occupied by voids) of voids in the cross section in the thickness direction of the base film is preferably 0.5% to 3%. In a case where the proportion of voids in the base film is 0.5% or greater, the base film is sufficiently stretched, and thus sufficient light reflecting properties are obtained and high weather resistance is imparted. In a case where the proportion of voids in the film is 3% or less, even in a case where the base film is exposed to the outside air for a long period of time, hydrolysis is suppressed, and thus it is possible to suppress the occurrence of cleavage fracture of the film.

For such a viewpoint, the total area (area occupied) of voids in the cross section in the thickness direction of the base film is more preferably 0.6% to 3%, and even more preferably 0.6% to 2.8%.

As a result of examination conducted by the inventors, it has been found that in the manufacturing of a base film including: adding titanium oxide particles to a polyester such that the content of the particles is the above-described predetermined content; mixing the polyester and the particles; performing melting extrusion to form an un-stretched polyester film; and stretching the film, the size of voids to be formed in the base film can be controlled by controlling the stretching conditions. The stretching will be described later in the section of the method of manufacturing a polyester film.

As a method of measuring the area occupied by voids present in the base film and a method of measuring the average area per void, methods described in examples are used, respectively.

The base film may contain other components in addition to the above-described polyester and titanium oxide particles, as long as the effects of the embodiment of the present disclosure are not impaired.

The base film may contain a fluorescent whitening agent such as thiophenediyl in order to increase whiteness. In a case where a fluorescent whitening agent is used, the content of the fluorescent whitening agent is preferably 0.01 mass % or greater and 1 mass % or less, more preferably 0.05 mass % or greater and 0.5 mass % or less, and even more preferably 0.1 mass % or greater and 0.3 mass % or less. In a case where the content of the fluorescent whitening agent is within the above-described range, the optical reflectivity improving effect is easily obtained, yellowing due to thermal decomposition during the formation of the base film by melting extrusion is suppressed, and a reduction in reflectivity is suppressed.

Examples of the fluorescent whitening agent which can be used for the base film include OB-1 (trade name) manufactured by Eastman Kodak Company.

(Thickness)

In the present disclosure, the thickness of the base film may be 40 μm to 400 μm.

In a case where the thickness of the base film is 40 μm or greater, high whiteness is obtained, there is no show-through, and good concealability can be obtained. In a case where the thickness of the base film is 400 μm or less, a reduction in hydrolysis resistance of the film due to a reduction in temperature raising and cooling ability during the film formation is suppressed. In addition, stretching can be performed without high load on the stretching machine during the stretching of an un-stretched film. In a case where the thickness of the base film is 60 μm or greater, the concealability is improved and the hardness is improved.

From such a viewpoint, the thickness of the base film is preferably 60 μm to 400 μm, more preferably 70 μm to 300 μm, and even more preferably 100 μm to 250 μm.

As a method of measuring the thickness of the polyester film according to the embodiment of the present disclosure, a method described in examples is used.

(Intrinsic Viscosity)

In the present disclosure, the base film preferably has an intrinsic viscosity (IV) of 0.65 dL/g to 0.85 dL/g.

In a case where IV of the base film is 0.65 dL/g or greater, sufficient weather resistance is obtained. In a case where IV of the base film is 0.85 dL/g or less, shear heat generation is suppressed in the extrusion step during the manufacturing of the base film, and a reduction in hydrolysis resistance is suppressed.

From such a viewpoint, IV of the base film is more preferably 0.67 dL/g to 0.80 dL/g, and even more preferably 0.68 dL/g to 0.77 dL/g.

In the present disclosure, as a method of measuring IV of the base film, a method described in examples is used.

(Concentration of Terminal Carboxyl Groups)

In the base film of the present disclosure, the concentration of terminal carboxyl groups is preferably 5 equivalents/ton to 25 equivalents/ton. The concentration of terminal carboxyl groups is also referred to as the acid value and may be expressed as "AV". In the present specification, "equivalents/ton" represents the molar equivalents of terminal carboxyl groups contained per ton (1,000 kg) of the base film, and may be expressed as "eq/t".

In a case where the concentration of terminal carboxyl groups in the base film is 5 equivalents/ton or greater, the number of carboxyl groups (COOH groups) on the surface does not become too small, that is, the polarity does not become too low. Thus, the base film can have good adhesion to different types of materials such as other resin layers.

$H^+$ of the COOH groups at the polyester molecular terminals acts as a catalyst and accelerates hydrolysis. In a case where the concentration of terminal carboxyl groups in the polyester film is 25 equivalents/ton or less, it is possible to suppress a reduction in hydrolysis resistance.

The concentration of terminal carboxyl groups is a value measured by the following method. That is, 0.1 g of a resin measurement sample is dissolved in 10 ml of a benzyl alcohol, and then a chloroform is added thereto to obtain a mixed solution. A phenol red indicator is added dropwise to the mixed solution. This solution is titrated with a reference liquid (0.01 mol/L KOH-benzyl alcohol mixed solution), and the concentration of terminal carboxyl groups is obtained from the dropping amount.

[Image Receiving Layer]

In the present disclosure, the image receiving layer is an image receiving layer which is provided on at least one surface of the base film described above, and in which the surface roughness standard deviation Rq of the outermost surface is 0.01 μm to 0.1 μm.

Hereinafter, at least one surface of the base film on which the image receiving layer is provided may be referred to as "front surface" or "first surface".

The image receiving layer is not particularly limited as long as it is a layer having a function of receiving an image forming material such as a printing ink or toner and forming an image, and can appropriately employ a configuration suitable for the image forming material such as a printing ink or toner to be applied to the polyester film according to the embodiment of the present disclosure.

The image receiving layer may have a single layer structure or a multilayer structure. In a case where a multilayer structure is employed, a structure in which plural layers having different functions are laminated may be employed.

As described above, regardless of whether the image receiving layer has a single layer structure or a multilayer structure, the surface roughness of the outermost surface, specifically, the surface roughness standard deviation Rq (1) of the outermost surface of the image receiving layer is within a range of 0.01 µm to 0.1 µm.

(Surface Roughness of Outermost Surface of Image Receiving Layer)

In the present disclosure, the surface roughness standard deviation Rq (1) of the outermost surface of the image receiving layer is within a range of 0.01 µm to 0.1 µm. In a case where the surface roughness standard deviation Rq (1) is within the above-described range, the polyester film according to the embodiment of the present disclosure has good glossiness.

In a case where the surface roughness standard deviation Rq (1) of the outermost surface of the image receiving layer is within a range of 0.01 µm to 0.1 µm, it is thought that the outermost surface has excellent smoothness and imparts good glossiness to the film according to the embodiment of the present disclosure.

The surface roughness standard deviation Rq (1) of the outermost surface is 0.01 to 0.1 µm, and preferably 0.01 µm to 0.06 µm.

The surface roughness standard deviation Rq (1) of the outermost surface of the image receiving layer can be measured in the same manner as in the method of performing direct measurement on the surface of the base film among the methods of measuring the surface roughness standard deviation Rq (0) of the base film described above.

Hereinafter, description will be given using a preferable embodiment of the image receiving layer in the present disclosure as an example, but the present disclosure is not limited to the following example.

The image receiving layer is provided on at least one surface of the base film, and includes a layer which is formed to include at least a resin.

In the present specification, the "image receiving layer" means a layer on which an image such as a toner image or an ink image (for example, an ink jet image) is formed in the polyester film according to the embodiment of the present disclosure. The image receiving layer may have a fixing layer to improve the fixability of a toner image. The outermost surface of the image receiving layer may have an antistatic layer to suppress a reduction in transportability due to static electricity generated by peeling electrification and to improve accumulation properties after printing and print handleability.

In the present specification, layers including the fixing layer and the antistatic layer, which are formed on the surface of the base film and are provided on the image forming side, are collectively referred to as the image receiving layer.

In a case where the image receiving layer has a laminated structure of two or more layers, the respective layers included in the image receiving layer may have the same composition or different compositions.

As the multilayer structure, for example, a multilayer structure including a fixing layer provided adjacent to the base film and an antistatic layer containing a conductive material is preferable.

In a case where the image receiving layer is provided on both surfaces of the base film, the image receiving layers on both the surfaces may have the same structure or different structures.

(Resin)

Examples of the resin which may be contained in the image receiving layer, particularly, the fixing layer provided adjacent to the base film include polyolefin resins, polyester resins, polyether resins, acrylic resins, epoxy resins, urethane resins, amino resins, and phenolic resins.

The image receiving layer preferably contains at least one selected from an acrylic resin, a urethane resin, a polyester resin, or a polyolefin resin from the viewpoint of an improvement in adhesion to the above-described base film.

In a case where the image receiving layer has an antistatic layer to be described later as an outermost surface thereof, the resin contained in the fixing layer and having good adhesion to the base film also has good adhesion to the antistatic layer.

The content of the resin in the image receiving layer is preferably 50 mass % to 95 mass %, more preferably 55 mass % to 90 mass %, and even more preferably 60 mass % to 90 mass % with respect to the total mass of the image receiving layer from the viewpoint of an improvement in adhesion to the base film.

The image receiving layer may contain plural types of resins. In a case where the image receiving layer contains plural types of resins, the total resin content is preferably within the above-described range.

The fixing layer in the image receiving layer preferably contains a polyolefin resin as a primary resin, and more preferably an acrylic resin as a secondary resin. In the present specification, the "primary resin" means a resin having the largest mass-based content among resins contained in a specific layer, and the "secondary resin" means a resin having the second largest mass-based content among resins contained in a specific layer. The "primary resin" is preferably contained in an amount of 50 mass % or greater with respect to the entire resins contained in the image receiving layer. The "primary resin" and the "secondary resin" may be contained in equal amounts. That is, the resins may be contained in an amount of 50 mass %, that is, at a one to one ratio on a mass basis with respect to the entire resins contained in the image receiving layer. In that case, both the two resins can be interpreted as the "primary resin".

In a case where the fixing layer contains a polyolefin as a primary resin, the softening temperature is low, and toner is easily embedded. In a case where the fixing layer contains an acrylic resin as a secondary resin, it is possible to improve the adhesive force of the toner image.

In a case where the fixing layer contains a polyolefin resin and an acrylic resin, the mass-based content ratio between the resins (that is, polyolefin resin:acrylic resin) is preferably 1:1 to 5:1, and more preferably 1:1 to 4:1.

As the resin contained in the fixing layer, a commercially available product may be used. Examples of commercially available resins which can be used for the fixing layer in the present disclosure are as follows.

Examples of the polyolefin resin include ARROW BASE (registered trademark) SE1013N, SA1200, SB1200, SE1200, and SD1200 (Unitika Ltd.), and CHEMIPEARL (registered trademark) S120, S650, S80N, A100, and V100 (Mitsui Chemicals, Inc.).

Examples of the acrylic resin include AQUABRID (registered trademark) AS563 (DAICEL FINECHEM LTD.), JURYMER (registered trademark) ET-410 (TOAGOSEI CO., LTD.), and BONRON (registered trademark) PS002 (Mitsui Chemicals, Inc.).

Examples of the urethane resin include SUPERFLEX (registered trademark) 150HS, 110, and 420 (DKS Co., Ltd.), HYDRAN (registered trademark) HW350 (DIC Corporation), and TAKELAC (registered trademark) WS400 and WS5100 (Mitsui Chemicals, Inc.).

Examples of the polyester resin include PESRESIN (registered trademark) A520 and A615GW (Takamatsu Oil & Fat Co., Ltd.), VYLONAL (registered trademark) MD1200 and MD1245 (Toyobo Co., Ltd.), FINETEX (registered trademark) ES650 and ES2200 (DIC Corporation), and PLASCOAT (registered trademark) Z687 and Z592 (Goo Chemical Co., Ltd.).

(Crosslinking Agent)

From the viewpoint of water resistance, the fixing layer preferably has a crosslinking structure derived from a crosslinking agent, and particularly preferably has a crosslinking structure derived from at least one selected from an oxazoline crosslinking agent, an epoxy crosslinking agent, a carbodiimide crosslinking agent, or an isocyanate crosslinking agent.

Examples of the oxazoline crosslinking agent include EPOCROS (registered trademark) WS700, WS300, K2010E, K2020E, and K2030E (Nippon Shokubai Co., Ltd.).

Examples of the epoxy crosslinking agent include DENACOL (registered trademark) EX614B and EX521 (Nagase ChemteX Corporation).

Examples of the carbodiimide crosslinking agent include CARBODILITE (registered trademark) V02, V02L2, SV02, and V10 (Nissinbo Chemical Inc.).

Examples of the isocyanate crosslinking agent include DURANATE (registered trademark) WB40, WT20, and WM44 (Asahi Kasei Corporation).

The content of the crosslinking agent contained in a coating liquid for forming a fixing layer (a coating liquid for forming a fixing layer) is appropriately determined in consideration of the resin type, the crosslinking agent type, and the like. In general, the content of the crosslinking agent is within a range of 1 mass % to 50 mass % with respect to the total solid content of the fixing layer.

(Surfactant)

The fixing layer may contain a surfactant in order to improve wettability of the coating liquid composition for forming a fixing layer relative to the base film and to improve levelability of the coating liquid.

Any one of a cationic surfactant, an anionic surfactant, or a nonionic surfactant can be used depending on the purpose as the surfactant which may be contained in the fixing layer or in the coating liquid composition for forming a fixing layer which is used to form the fixing layer.

Preferable examples of the surfactant include fluorine-based surfactants such as SURFLON (registered trademark) S231W (AGC Seimi Chemical Co., Ltd.) and sodium=1.2-{bis(3,3,4,4,5,5,6,6,6-nonafluorohexylcarbonyl)} ethanesulfonate, anionic surfactants such as sulfosuccinates and alkylsulfonates, and nonionic surfactants such as polyoxyethylene alkyl ether.

(Other Materials)

The fixing layer may further contain a known material such as a colorant, an ultraviolet absorber, an antioxidant, or a fluorescent whitening agent as necessary without significantly impairing the fixability and the accumulation properties of an image.

The fixing layer may further contain a conductive material to be described later.

The conductive material may be contained in the resin of the image receiving layer, or in the antistatic layer which is provided as an outermost surface of the resin-containing layer. The content of the conductive material contained per unit volume of the fixing layer is preferably smaller than that of the conductive material contained per unit volume of the antistatic layer in the image receiving layer. It is more preferable that the conductive material is not contained in the fixing layer, and conductive particles are contained only in the antistatic layer further provided in the image receiving layer. Here, the content of the conductive material contained per unit volume of the image receiving layer including the fixing layer and the antistatic layer is on a mass basis and can be adjusted depending on the concentration (on a mass basis) of the conductive material in a coating liquid for forming each of the layers.

(Antistatic Layer)

The antistatic layer contains a resin and at least one conductive material selected from conductive particles or a conductive polymer, and is preferably provided as an outermost surface of the image receiving layer.

(Resin in Antistatic Layer)

Examples of the resin contained in the antistatic layer include polyolefin resins, polyester resins, polyether resins, acrylic resins, epoxy resins, urethane resins, amino resins, and phenolic resins.

From the viewpoint of good adhesion to the base film, the fixing layer provided on the base film side, a toner image, or the like, the antistatic layer preferably contains, as the resin, at least one selected from an acrylic resin, a urethane resin, a polyester resin, or a polyolefin resin.

From the viewpoint of good antistatic properties and good adhesion to a toner during the formation of a toner image, the content of the resin in the antistatic layer is preferably 20 mass % to 95 mass %, more preferably 25 mass % to 90 mass %, and even more preferably 30 mass % to 85 mass % with respect to the total mass of the antistatic layer.

The antistatic layer may contain plural types of resins. In a case where plural types of resins are contained, the total resin content is preferably within the above-described range.

The antistatic layer preferably contains a polyolefin resin as a primary resin, and more preferably an acrylic resin as a secondary resin. In the polyester film according to the embodiment of the present disclosure, the antistatic layer which is positioned on the outermost surface preferably contains a polyolefin resin as a primary resin, and thus running performance in a case where the film is used as an electrophotographic recording medium is improved.

In a case where the antistatic layer contains a polyolefin resin and an acrylic resin, the mass-based content ratio between the resins (polyolefin resin:acrylic resin) is preferably 1:1 to 10:1.

A commercially available product may be used as the resin contained in the antistatic layer.

Regarding commercially available resins contained in the antistatic layer, examples of the polyolefin resin include ARROW BASE (registered trademark) SE1013N, SA1200, SB1200, SE1200, and SD1200 (Unitika Ltd.) and CHEMIPEARL (registered trademark) S120, S650, S80N, A100, and V100 (Mitsui Chemicals, Inc.).

Examples of the acrylic resin include AQUABRID (registered trademark) AS563 (DAICEL FINECHEM LTD.), JURYMER (registered trademark) ET-410 (TOAGOSEI CO., LTD.), and BONRON (registered trademark) PS002 (Mitsui Chemicals, Inc.).

Examples of the urethane resin include SUPERFLEX (registered trademark) 150HS, 110, and 420 (DKS Co., Ltd.), HYDRAN (registered trademark) HW350 (DIC Corporation), and TAKELAC (registered trademark) WS400 and WS5100 (Mitsui Chemicals, Inc.).

Examples of the polyester resin include PESRESIN (registered trademark) A520 and A615GW (Takamatsu Oil & Fat Co., Ltd.), VYLONAL (registered trademark) MD1200 and MD1245 (Toyobo Co., Ltd.), FINETEX (registered trademark) ES650 and ES2200 (DIC Corporation), and PLASCOAT Z687 and Z592 (Goo Chemical Co., Ltd.).

(Conductive Material)

The antistatic layer contains, in addition to the above-described resin, at least one conductive material selected from conductive particles or a conductive polymer.

As the conductive material in the antistatic layer, a conductive material selected from conductive particles and a conductive polymer may be used singly, or two or more types thereof may be used in combination. For example, two or more types of conductive particles or conductive polymers may be used in combination, or conductive particles and a conductive polymer may be used in combination.

The conductive material in the antistatic layer is preferably contained such that the surface resistivity is within a preferable range ($10^7$ to $10^{10}$ Ω/sq) to be described later. Although the content of the conductive material depends on the type of the conductive material, it is adjusted in consideration of film scratch resistance or haze in addition to the surface resistivity. In general, the content of the conductive material in the antistatic layer is within a range of 5 mass % to 70 mass %.

—Conductive Particles—

Examples of the conductive particles which can be used as the conductive material in the antistatic layer include metal oxides, heterogeneous element-containing metal oxides, metal powders, metal fibers, and carbon fibers. Particles coated with a conductive material (hereinafter, may be referred to as conductive material-coated particles) may be used.

Examples of the metal oxides include ZnO, TiO, $SnO_2$, $Al_2O_3$, $In_2O_3$, $SiO_2$, MgO, BaO, and $MoO_3$. The metal oxides may be used singly, or a composite oxide thereof may be used.

A metal oxide containing a heterogeneous element is also preferably used. For example, Al, In, or the like is preferably contained in ZnO, Nb, Ta, or the like is preferably contained in TiO, and Sb, Nb, a halogen element, or the like is preferably contained in $SnO_2$. Among these, $SnO_2$ doped with Sb is particularly preferable.

Examples of the metal powders include a powder of Ag, Cu, Ni, or Fe.

Examples of the metal fibers include a steel fiber.

Examples of the scale-like metal include silver foil.

The particles coated with a conductive material (that is, conductive material-coated particles) are particles obtained by coating a surface of a core material (that is, core particles) with a conductive coating material, and spherical, acicular, or fibrous particles can be used.

Examples of the core material include metal oxides, whiskers (for example, aluminum borate, potassium titanate, or rutile type titanium oxide), inorganic fibers (for example, a glass fiber), mica flakes, and organic particles.

Examples of the conductive coating material include metals (for example, Ag, Au, Al, Cr, Cd, Ti, Ni, or Fe), conductive metal oxides, and carbons.

Examples of the coating method include a method of adhering a conductive material to surfaces of core particles by plating, a vacuum deposition method, a mechanochemical method, or the like.

Preferable examples of the conductive material-coated particles include conductive particles obtained by coating surfaces of organic particles with a conductive material.

Examples of the method of coating surfaces of organic particles with a conductive material include methods such as plating and a mechanochemical method of adhering coating particles of a conductive material to surfaces of core particles of an organic material.

Examples of the organic material which forms organic particles include polyolefins such as polyethylene and polypropylenes, starch, polystyrene, styrene-divinylbenzene copolymers, melamine resins, epoxy resins, phenolic resins, and fluororesins. These organic materials may be used singly, or two or more types thereof may be used in combination.

The conductive material used for coating surfaces of organic particles is preferably a substance of which the volume resistivity is $1\times10^{-5}$ to $1\times10^4$ Ω. Examples thereof include metals such as Al, Cr, Cd, Ti, Fe, Cu, In, Ni, Pd, Pt, Rh, Ag, Au, Ru, W, Sn, Zr, and In; alloys such as stainless steel, brass, and Ni—Cr; metal oxides such as an indium oxide, a tin oxide, a zinc oxide, a titanium oxide, a vanadium oxide, a ruthenium oxide, and a tantalum oxide; and metal compounds such as silver iodide.

Particularly preferable examples of the conductive material-coated particles include conductive particles obtained by performing metal plating on surfaces of organic particles. Here, as the metal, Au, Ni, and Sn are preferable, and Au is particularly preferable.

In the conductive material-coated particles, a mass ratio of the organic particles to the conductive substance is generally within a range of 1:20 to 20:1, and preferably 1:5 to 5:1.

The shape of the conductive particles is not particularly limited, and spherical conductive particles, acicular conductive particles, fibrous conductive particles, scale-like conductive particles, and the like can be used. From the viewpoint of easy contact between the conductive particles, acicular or fibrous conductive particles are preferably used. Acicular particles obtained by doping $SnO_2$ with Sb are particularly preferable.

From the viewpoint of securing a contact between the conductive particles, the average particle size of the conductive particles is preferably larger than half the film thickness of the antistatic layer. From the viewpoint of an improvement in haze and scratch resistance, the average particle size is preferably smaller than twice the film thickness of the antistatic layer.

In a case where acicular, rod-like, columnar, or fibrous conductive particles are used instead of spherical conductive particles, an average particle size of a short axis and a long axis is obtained. In a case where conductive particles of which the shape is not spherical are used, the short axis of the conductive particles is preferably smaller than twice the film thickness, and larger than half the film thickness.

(Method of Measuring Average Particle Size of Conductive Particles)

In the present specification, 20 arbitrary conductive particles present in the antistatic layer are observed with an electron microscope to measure particle sizes, and an average of the particle sizes is obtained and employed as the average particle size of the conductive particles.

In a case where the particle shape is not spherical, the average particle size of minor axes of the particles, that is, the average minor axis of the particles is measured in the same manner in consideration of the influence on the surface roughness. As necessary, the average major axis of the particles may be measured in the same manner.

As the conductive particles, a commercially available product can be used. As the commercially available conductive particles, for example, acicular metal oxides having a high aspect ratio such as "TIPAQUE (registered trademark) FT" series obtained by allowing acicular rutile type $TiO_2$ to have conductive properties (Ishihara Sangyo Kaisha, Ltd.), "TIPAQUE (registered trademark) FS" series such as FS-10D (aqueous dispersion of Sb-doped acicular $SnO_2$) (Ishihara Sangyo Kaisha, Ltd.), "PASTRAN (registered trademark)" series (Mitsui Mining & Smelting Co., Ltd.), and "DENTOL (registered trademark) BK and WK" series obtained by allowing potassium titanate whisker ($K_2O.8TiO_2$) to have conductive properties (Otsuka Chemical Co., Ltd.) can be preferably used. TDL-1 (an aqueous dispersion of Sb-doped granular $SnO_2$, JEMCO Components & Fabrication, Inc.) and the like can also be preferably used.

—Conductive Polymer—

Examples of the conductive polymer which can be used as the conductive material in the antistatic layer include polyacetylene-based polymers, polypyrrole-based polymers, polythiophene-based polymers, and polyaniline-based polymers.

A commercially available product can be used as the conductive polymer, and examples thereof include Orgacon (registered trademark) HBS (polyethylene dioxythiophene/polystyrene sulfonate, AGFA).

The conductive polymer may be contained in the form of particles in the antistatic layer.

(Crosslinking Agent)

From the viewpoint of water resistance, the antistatic layer preferably has a crosslinking structure derived from a crosslinking agent, and particularly preferably has a crosslinking structure derived from at least one selected from an oxazoline crosslinking agent, an epoxy crosslinking agent, a carbodiimide crosslinking agent, or an isocyanate crosslinking agent.

Examples of the oxazoline crosslinking agent include EPOCROS (registered trademark) WS700, WS300, K2010E, K2020E, and K2030E (Nippon Shokubai Co., Ltd.).

Examples of the epoxy crosslinking agent include DENACOL (registered trademark) EX614B and EX521 (Nagase ChemteX Corporation).

Examples of the carbodiimide crosslinking agent include CARBODILITE (registered trademark) V02, V02L2, SV02, and V10 (Nissinbo Chemical Inc.).

Examples of the isocyanate crosslinking agent include DURANATE (registered trademark) WB40, WT20, and WM44 (Asahi Kasei Corporation).

The content of the crosslinking agent contained in a coating liquid for forming an antistatic layer (a coating liquid for forming an antistatic layer) depends on the resin type, the crosslinking agent type, and the like. In general, the content of the crosslinking agent is within a range of 1 mass % to 50 mass % with respect to the total solid content of the antistatic layer.

(Surfactant)

The antistatic layer may contain a surfactant in order to increase wettability relative to the base film or the fixing layer which is provided adjacent thereto and to improve levelability of the coating liquid. The surfactant may be contained in a coating liquid composition for forming an antistatic layer so as to be contained in the antistatic layer.

Any one of a cationic surfactant, an anionic surfactant, or a nonionic surfactant can be selected as the surfactant depending on the purpose.

Likewise, the examples of the fluorine-based surfactant, the anionic surfactant, and the nonionic surfactant exemplified in the above-described fixing layer can be mentioned as preferable examples of the surfactant contained in the antistatic layer.

(Other Materials)

The antistatic layer may contain an additive such as a release agent or a filler.

For example, the release agent which may be contained in the antistatic layer can be selected from a silicone compound, a fluorine compound, wax, and a matting agent.

As the release agent, one or more types thereof may be contained in the antistatic layer.

Preferable examples of the release agent in the antistatic layer include silicone oil, polyethylene wax, carnauba wax, silicone particles, and polyethylene wax particles.

Examples of the filler which may be contained in the antistatic layer include silica, alumina, titanium oxide, and zirconium oxide. As the filler, silica or alumina is particularly preferable, and colloidal silica is more preferable.

As the filler, one type thereof may be used singly, or two or more types thereof may be used in combination.

In a case where the image receiving layer contains particles, the maximum value of an average minor axis of the particles contained in an amount of 40 mass % or greater in the image receiving layer is preferably 0.005 μm to 0.2 μm.

Representative examples of the particles include the above-described conductive particles and conductive polymer particles.

In addition, examples of the particles which may be contained in the image receiving layer include wax particles as a release agent, and organic or inorganic fillers to be contained optionally depending on the purpose such as adjustment of surface roughness.

The content of the particles in the image receiving layer can be measured in the same manner as in the method of measuring the content of the titanium oxide particles in the base film described above.

(Thickness)

In the present disclosure, the thickness of the image receiving layer is preferably 2 μm to 6 μm, and more preferably 3 μm to 5 μm.

In a case where the thickness of the image receiving layer is 2 μm or greater, a transferred toner or a jetted ink on the image receiving layer is sufficiently embedded easily up to the inside of the image receiving layer in a case where the polyester film according to the embodiment of the present disclosure is used as, for example, an electrophotographic image receiving sheet or an image receiving sheet for ink jet printing. Accordingly, it is possible to significantly increase fixability of the toner or the ink jet image. The thickness of the image receiving layer is preferably 6 μm or less, since the occurrence of cohesive failure is effectively suppressed in the image receiving layer during the fixing of the image, and thus a high-quality image is easily formed.

In a case where the image receiving layer has a laminated structure of two or more layers, the sum of the thicknesses of all the layers is preferably within the above-described range.

In a case where the image receiving layer has the above-described antistatic layer as an outermost surface, the thickness of the antistatic layer is preferably smaller than that of the fixing layer in the image receiving layer. The thickness of the antistatic layer is preferably within a range of 0.01 μm to 1 μm, and more preferably 0.02 μm to 0.5 μm from the viewpoint of effectively suppressing charging.

The thickness of the image receiving layer and the thickness of each layer in the image receiving layer can be measured by observing a cut surface in the thickness direction of the polyester film according to the embodiment of the present disclosure with an electron microscope.

<Method of Manufacturing Polyester Film>

The method of manufacturing a polyester film according to the embodiment of the present disclosure is not particularly limited, but the film can be preferably manufactured by, for example, the following manufacturing method according to the embodiment of the present disclosure.

The method of manufacturing a polyester film according to the embodiment of the present disclosure has a step (step (I)) of forming a base film which is biaxially stretched at least 12 times in area magnification by subjecting an un-stretched polyester film containing a polyester and titanium oxide particles and having an intrinsic viscosity of 0.70 dL/g to 0.90 dL/g to longitudinal stretching in a length direction and lateral stretching in a width direction, and a step (step (II)) of forming an image receiving layer by coating at least one surface of the obtained base film with a coating liquid for forming an image receiving layer.

The method of manufacturing a polyester film according to the embodiment of the present disclosure may include other steps in addition to the above-described step (I) and step (II).

For example, after stretching of the above-described un-stretched polyester film, a step of thermally fixing the stretched film, a thermal relaxation step, or the like is preferably performed.

Furthermore, a step of performing in-line coating for forming an undercoat layer after formation of the un-stretched polyester film and before stretching, or after stretching in one direction and before stretching in the other direction may be included.

Hereinafter, each step will be described in detail, but the method of producing a polyester film according to the embodiment of the present disclosure is not limited to the following method.

[Step (I)]

The method of manufacturing an un-stretched polyester film is not particularly limited. For example, an un-stretched film can be obtained by film formation through melting extrusion of a raw material polyester, titanium oxide particles, and other raw materials which are used in combination as necessary.

An un-stretched polyester film (hereinafter, may be referred to as un-stretched film) can be formed by melt-extruding and cooling a mixture containing a raw material polyester and titanium oxide particles.

For example, the above-described polyester and titanium oxide particles as raw materials are dried and melted, and the obtained molten substance (melt) is allowed to pass through a gear pump and a filter. After that, the molten substance is extruded onto a cooling roll (cast drum), and cooled and solidified, and thus an un-stretched film can be obtained. The melting may be performed using an extruder, and a monoaxial extruder or a multiaxial (biaxial or more) extruder may be used as the extruder.

The titanium oxide particles can be blended into the polyester film using various known methods. Representative examples of the methods include the following methods.

(A) A method in which titanium oxide particles are added before the end of a transesterification reaction or an esterification reaction in the synthesis of a polyester, or added before the initiation of a polycondensation reaction in the synthesis of a polyester.

(B) A method in which titanium oxide particles are added to a polyester, and are melted and kneaded.

(C) A method in which a master batch (also referred to as "master pellets") in which a large amount of titanium oxide particles is contained by the above-described method (A) or (B) is manufactured, and the master batch and a polyester containing no titanium oxide particles or containing a small amount of titanium oxide particles are kneaded such that a predetermined amount of titanium oxide particles is contained.

(D) A method in which melting and kneading are performed using the master pellets in the method (C) as they are.

Among these, the method (C), that is, the method in which a master batch (hereinafter, may be referred to as "MB") in which a large amount of titanium oxide particles is contained is manufactured, and the master batch and a polyester containing no titanium oxide particles or containing a small amount of titanium oxide particles are kneaded such that a predetermined amount of titanium oxide particles is contained as described above (hereinafter, may be referred to as "master batch method") is preferable.

Examples of the method of manufacturing MB include a method in which a polyester which has not been previously dried and titanium oxide particles are put into an extruder, and a master batch is prepared while dehydration and deaeration are performed.

In a case where MB is prepared using a polyester which has been previously dried to some extent, examples of the method of manufacturing MB include a method in which extrusion is performed during deaeration. In addition, examples of the method of manufacturing MB also include a method in which extrusion is performed without deaeration in a case where a polyester which has been sufficiently dried previously is used.

In the manufacturing of MB, an increase in acid value of polyester is further suppressed in the preparation of MB using a polyester which has been previously dried to some extent than in the preparation of MB using a polyester which has not been previously dried.

That is, in the preparation of a master batch (MB), the moisture content of a polyester resin to be put into an extruder is preferably reduced by previous drying. Regarding the drying conditions, the temperature is preferably 100° C. to 200° C., and more preferably 120° C. to 180° C., and the time is 1 hour or longer, more preferably 3 hours or longer, and even more preferably 6 hours or longer. In a case where the drying is performed under the above conditions, the polyester resin can be sufficiently dried such that the moisture content of the polyester resin preferably reaches 50 ppm or less, and more preferably reaches 30 ppm or less.

The preliminary mixing method is not particularly limited. The preliminary mixing may be performed by a method using a batch, or a monoaxial or multiaxial kneading extruder. In a case where a master batch is prepared during deaeration, it is preferable to employ a method in which a polyester resin is melted at a temperature of 250° C. to 300° C., and preferably 270° C. to 280° C., and deaeration by suction is continuously performed at 0.05 MPa or greater, and more preferably 0.1 MPa or greater in a preliminary mixer provided with one deaeration port, and preferably two or more deaeration ports to maintain a reduced pressure in the mixer.

The molten resin (melt) is preferably extruded under a vacuum exhaust or inert gas atmosphere.

In the extruder, the melting temperature is preferably not lower than the melting point of a polyester to be used, and not higher than the melting point+80° C., more preferably not lower than the melting point+10° C., and not higher than the melting point+70° C., and even more preferably not lower than the melting point+20° C., and not higher than the melting point+60° C. The melting temperature in the extruder is preferably the melting point+10° C. or higher since the resin is sufficiently melted. In addition, the melting temperature in the extruder is preferably the melting point+70° C. or lower since decomposition of the polyester and the like is suppressed.

The raw material polyester is preferably dried before the raw materials are put into the extruder, and the moisture content is preferably 10 ppm to 300 ppm, and more preferably 20 ppm to 150 ppm.

For the purpose of further improving the hydrolysis resistance, a terminal blocking agent may be added in the melting of the raw material resin.

The terminal blocking agent may be directly added to the extruder in addition to the resin such as a polyester. However, from the viewpoint of extrusion stability, it is preferable that a polyester and a master batch are previously formed and put into the extruder.

The extruded molten substance (melt) passes through a gear pump, a filter, and a die, and is cast onto a cast drum (cooling roll). The shape of the die may be any one of a T-die, a hanger coat die, or a fish tail. On the cast drum, the molten resin (melt) can be adhered to the cooling roll using a static electricity application method. The surface temperature of the cast drum can be set to approximately 10° C. to 40° C. The diameter of the cast drum is preferably 0.5 m or greater and 5 m or less, and more preferably 1 m or greater and 4 m or less. The driving speed (the linear velocity of the outermost periphery) of the cast drum is preferably 1 m/minute or greater and 50 m/minute or less, and more preferably 3 m/minute or greater and 30 m/minute or less.

The un-stretched polyester film thus obtained is first stretched in at least one of a length direction (MD) or a width direction (TD).

It is preferable that the stretching includes first to N-th stretching steps of stretching an un-stretched polyester film in at least one of a length direction or a width direction, an n-th stretching step is performed continuously after an n−1-th stretching step, the stretching speed in one of the longitudinal direction or the width direction of the film is increased in the n-th stretching step compared with the n−1-th stretching step, and in the N-th stretching step, the stretching temperature is set to 140° C. to 180° C., and the stretching speed is set such that the length in one direction of the film before the initiation of the first stretching step is increased by 8% to 25% for one second.

In a case where an un-stretched polyester film is stretched in a length direction or a width direction, crystallization of the polyester is suppressed by stretching at a low stretching speed at an initial stage of stretching, and in a state in which the polyester at a final stage of stretching is sufficiently heated, the stretching speed is increased to obtain a desired stretching ratio, such that peeling between the titanium oxide particles and the polyester can be minimized, minute spaces are formed in the vicinity of the titanium oxide particles, and minute voids having the above-described preferable size are easily formed.

In the stretching, the film may be subjected to any one of monoaxial stretching for film stretching in only one of MD and TD, or biaxial stretching for stretching in both MD and TD. However, from the viewpoint of improving weather resistance, it is preferable that biaxial stretching is performed, and from the viewpoint of facilitating stretching, it is more preferable that stretching in MD (may be referred to as "longitudinal stretching") is performed, and then stretching in TD (may be referred to as "lateral stretching") is performed.

In a case where biaxial stretching is performed, an un-stretched film is longitudinally stretched in a length direction, and then first to N-th lateral stretching steps (N is an integer of 2 or more) are performed as a stretching step for lateral stretching in a width direction (lateral stretching step). An n-th lateral stretching step (n is an integer of 2 to N) is performed continuously after an n−1-th lateral stretching step, and the stretching speed in the width direction of the film is increased in the n-th lateral stretching step compared with the n−1-th lateral stretching step. In addition, in the N-th lateral stretching step, it is preferable that the stretching temperature is set to 140° C. to 180° C., and the stretching speed is set such that the length in the width direction of the film before the initiation of the first lateral stretching step is increased by 8% to 25% for one second.

Hereinafter, a case where stretching is performed in the width direction after the stretching in the length direction will be described.

FIG. 1 schematically shows an example of a biaxial stretching machine which is used to manufacture a base film of the polyester film according to the embodiment of the present disclosure. FIG. 1 shows a biaxial stretching machine 100 and a polyester film 200 as a base film (hereinafter, may be simply referred to as "base") mounted on the biaxial stretching machine 100. The biaxial stretching machine 100 includes a pair of cyclic rails 60a and 60b which are symmetrically arranged with respect to the base 200.

The biaxial stretching machine 100 is divided into a preheating portion 10 which preheats the base 200, a stretching portion 20 which stretches the base 200 in a direction of the arrow TD orthogonal to the arrow MD to impart a tension to the base 200, a thermal fixing portion 30 which heats the base 200 imparted with the tension while maintaining the tension imparted to the base, a thermal relaxation portion 40 which heats the thermally fixed base 200 to relax the tension of the thermally fixed base 200, and a cooling portion 50 which cools the base 200 which has passed through the thermal relaxation portion.

The cyclic rail 60a includes at least holding members 2a, 2b, 2e, 2f, 2i, and 2j which can be moved along the edge of the cyclic rail 60a, and the cyclic rail 60b includes at least holding members 2c, 2d, 2g, 2h, 2k, and 2l which can be moved along the edge of the cyclic rail 60b. The holding members 2a, 2b, 2e, 2f, 2i, and 2j hold one end portion of the base 200 in TD, and the holding members 2c, 2d, 2g, 2h, 2k, and 2l hold the other end portion of the base 200 in TD. The holding members 2a to 2l are generally referred to as chucks, clips, or the like.

In FIG. 1, the holding members 2a, 2b, 2e, 2f, 2i, and 2j are moved counterclockwise along the edge of the cyclic rail 60a, and the holding members 2c, 2d, 2g, 2h, 2k, and 2l are moved clockwise along the edge of the cyclic rail 60b.

The holding members 2a to 2d hold an end portion of the base 200 in the preheating portion 10, move along the edge of the cyclic rail 60a or 60b while holding the base, pass through the stretching portion 20 and the thermal relaxation portion 40 in which the holding members 2e to 2h are shown, and proceed up to the cooling portion 50 in which the holding members 2i to 2l are shown. After that, the holding members 2a and 2b and the holding members 2c and 2d release the end portion of the base 200 at an end portion of the cooling portion 50 on the downstream side in MD in the transportation direction order, proceed along the edge of the cyclic rail 60a or 60b, and return to the preheating portion 10.

As a result, the base 200 is moved in the direction of the arrow MD in FIG. 1, and is sequentially transported to the preheating portion 10, the stretching portion 20, the thermal fixing portion 30, the thermal relaxation portion 40, and the cooling portion 50.

The moving speed of the holding members 2a to 2l becomes the transportation speed of the holding portions of the base 200.

The moving speed of each of the holding members 2a to 2l can be changed.

Therefore, the biaxial stretching machine 100 enables lateral stretching in which the base 200 is stretched in TD in the stretching portion 20, and also can stretch the base 200 in MD by changing the moving speeds of the holding members 2a to 2l.

That is, it is also possible to perform biaxial stretching at the same time using the biaxial stretching machine 100.

In FIG. 1, only 12 holding members 2a to 2l which hold the end portions of the base 200 in TD are shown. However, in order to support the base 200, the biaxial stretching machine 100 has holding members not shown in the drawing in addition to 2a to 2l.

Hereinafter, the holding members 2a to 2l may also be collectively referred to as "holding member 2".

(Preheating Portion)

In the preheating portion 10, the base 200 is preheated. Lateral stretching of the base 200 is facilitated by previously heating the base 200 before stretching.

The film surface temperature at the end point of the preheating portion (hereinafter, also referred to as "preheating temperature") is preferably Tg−10° C. to Tg+60° C., and more preferably Tg° C. to Tg+50° C. where Tg represents the glass transition temperature of the base 200.

Meanwhile, the end point of the preheating portion refers to a time point when preheating of the base 200 ends, that is, a position at which the base 200 is separated from the region of the preheating portion 10.

(Stretching Portion)

In the stretching portion 20, the preheated base 200 is laterally stretched at least in a direction (TD) orthogonal to the length direction (transportation direction, MD) of the base 200, and thus a tension is imparted to the base 200.

The stretching (lateral stretching) of the base 200 in the direction (TD) orthogonal to the machine direction (transportation direction, MD) means stretching in a direction perpendicular (90°) to the length direction (transportation direction, MD) of the base 200.

—MD Stretching—

In the biaxial stretching, an un-stretched base 200 formed by the extruder is longitudinally stretched in the length direction of the base 200 at, for example, a stretching stress of 5 MPa to 15 MPa and a stretching ratio of 2.5 times to 4.5 times.

More specifically, the base 200 is guided to a roll group heated to a temperature of 70° C. to 120° C., and is longitudinally stretched in the length direction (longitudinal direction, that is, film proceeding direction) at a stretching stress of 5 MPa to 15 MPa and a stretching ratio of 2.5 times to 4.5 times, and more preferably at a stretching stress of 8 MPa to 14 MPa and a stretching ratio of 3.0 times to 4.0 times. After the longitudinal stretching, the base is preferably cooled in the roll group having a temperature of 20° C. to 50° C.

—TD Stretching—

After the MD stretching, TD stretching is performed. TD stretching is preferably performed using a tenter. The base 200 subjected to the MD stretching is guided to a tenter, and is stretched in the width direction (TD stretching) in an atmosphere heated to, for example, a temperature of 80° C. to 180° C. (stretching temperature). In the tenter, both ends of the base 200 are held by clips, and the clips are broadened in a direction perpendicular to the length direction, that is, the width direction while transporting the base to a heat treatment zone, and thus the TD stretching can be performed.

The width direction stretching includes first to N-th lateral stretching steps (N is an integer of 2 or more). An n-th lateral stretching step (n is an integer of 2 to N) is performed continuously after an n−1-th lateral stretching step, and the stretching speed in the width direction of the base 200 is increased in the n-th lateral stretching step compared with the n−1-th lateral stretching step. In the N-th lateral stretching step, the stretching temperature is set to 140° C. to 180° C., and the stretching speed is set such that the length in the width direction of the base 200 before the initiation of the first lateral stretching step is increased at 8%/sec (8% per second) to 25%/sec.

Figure 2:
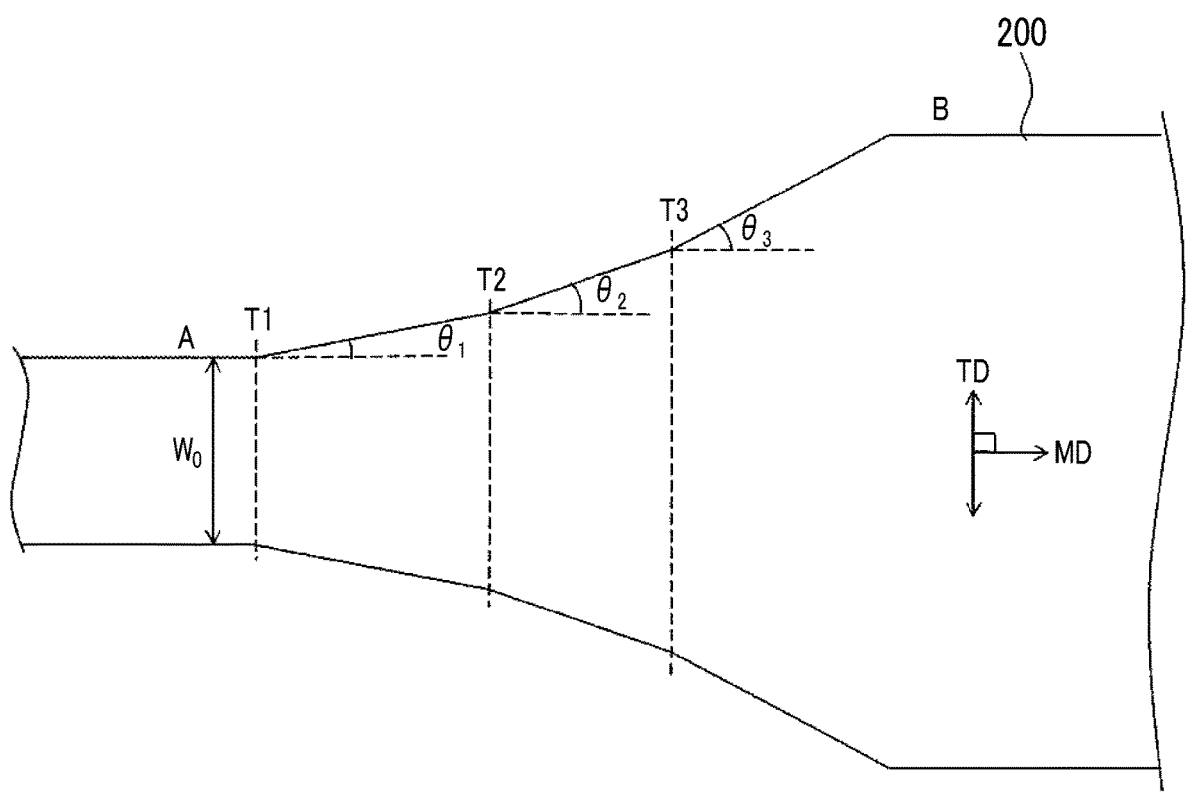
FIG. 2 is a schematic diagram showing an example of a stretching aspect of a white polyester film in a lateral stretching step in steps of manufacturing a stretched white polyester film according to the embodiment of the present disclosure.

FIG. 2 schematically shows an example of an aspect in which TD stretching is performed in stages in the manufacturing of a base film which is used for the polyester film according to the embodiment of the present disclosure.

In FIG. 2, a position A is the position of one end portion in a width direction (TD) of a base 200 which is positioned in the preheating portion in a state before lateral stretching. A position B is the position of one end portion in the width direction (TD) of the base 200 which is positioned in the thermal fixing portion in a state in which the lateral stretching ends.

T1, T2, and T3 represent the position of one end portion in the width direction (TD) of the base 200 which is positioned in the stretching portion and in which lateral stretching is started at a first stretching speed, a second stretching speed, and a third stretching speed, respectively. The end portion in the width direction (TD) of the base 200 reaches the position B from the position A via T1, T2, and T3.

In the present disclosure, in a case where lateral stretching is performed, the number of stages in changing the stretching speed is not limited to three, and the stretching speed may be changed in two or more stages. However, the stretching speed is preferably changed in 3 to 8 stages from the viewpoint of manufacturing easiness.

In the lateral stretching, the film is stretched in TD at each of T1, T2, and T3, and thus the width thereof is gradually increased. The film is continuously transported in MD, and TD stretching is started at T1. Until the film reaches T2, the film is stretched in TD at a stretching angle θ1 with respect to TD.

The stretching speed in TD can be adjusted by the transportation speed in MD and the stretching angle θ1. That is, in a case where the transportation speed in MD is constant, the stretching speed in TD is increased as the stretching angle θ1 is increased. The stretching speed can be expressed by an increment in width per second with respect to the length (width W0) in TD of the film before the start of the lateral stretching. For example, in changing the stretching speed in TD in three stages as shown in FIG. 2, in a case where the width W0 of the film before the start of the lateral stretching is 100, and the film is stretched in TD such that the film width is increased at a rate of 5 per second until the film reaches T2 from T1, the stretching speed in TD is 5%/sec.

In this embodiment, during the period from the start of the stretching in TD to the end of the stretching, the stretching angle is increased in stages or continuously during the transportation of the film in MD to increase the stretching speed, and thus the N-th lateral stretching step is performed at a stretching temperature of 140° C. to 180° C. and a stretching speed increased such that the length W0 in the width direction before the start of the stretching in the width direction is increased at 8%/sec to 25%/sec.

Here, the stretching temperature when the base 200 is laterally stretched represents the film surface temperature, and can be controlled by temperature control means provided in the tenter. The stretching temperature in the lateral stretching is increased together with the stretching speed, and the stretching temperature when the lateral stretching is started is preferably 80° C. to 120° C., and more preferably 85° C. to 115° C. from the viewpoint of suppression of the crystallization of the polyester at an initial stage of the lateral stretching.

The stretching temperature in the N-th lateral stretching step is preferably 140° C. to 180° C., and more preferably 145° C. to 175° C. from the viewpoint of causing peeling at the interface between the titanium oxide particles and the polyester, thereby generating minute voids.

The stretching temperature is a value obtained by measuring the temperature of the surface of the film in stretching with a thermocouple.

In this manner, in a case where lateral stretching is performed by increasing the stretching speed in the width direction in stages, it is possible to control the size of voids generated with the titanium oxide particles as a starting point in the film, and controlling the size of voids is most influenced by the final stretching speed in the stretching portion which performs the lateral stretching.

In the first half region of the stretching portion where the film temperature is relatively low, the stretching is gently performed, and the stretching is performed under conditions where interfacial peeling between the titanium oxide particles and the polyester hardly occurs.

In the second half where the film temperature is high, the stretching is performed at a desired ratio to impart weather resistance. However, in a case where the stretching speed is too high in the second half, the stress for stretching the polyester exceeds the interfacial adhesion strength between the titanium oxide particles and the polyester, and peeling occurs between the titanium oxide particles and the polyester. In a case where the stretching speed is too low, the orientation of the polyester molecules is insufficient, and thus weather resistance is insufficient.

In addition, in a case where the stretching speed is too high in the first half, the polyester stretching stress exceeds the interfacial adhesion strength between the titanium oxide particles and the polyester, and peeling occurs between the titanium oxide particles and the polyester. In a case where the stretching speed is too low, crystallization of the polyester progresses, and thus the polyester is hardened, the polyester stretching stress increases, and peeling occurs between the polyester and the titanium oxide particles.

From such a viewpoint, the stretching speed in the width direction in the first lateral stretching step is preferably such a stretching speed that the length in the width direction is increased at 4%/sec to 10%/sec with respect to the length in the width direction of the base 200 before the start of the first lateral stretching step. For example, in a case where the stretching speed in the lateral direction is changed in three stages as shown in FIG. 2, the stretching speed at which the film is stretched from T1 to T2 is the stretching speed in the first lateral stretching step.

For the reasons described above, the lower the stretching speed immediately after the start of stretching, the harder the polyester, such that the polyester stretching stress immediately before the end of the stretching is likely to increase, and peeling easily occurs from the titanium oxide particles. It is necessary to adjust the stretching speed immediately before the end of the stretching according to the stretching speed immediately after the start of the stretching, and in a case where the stretching speed in the width direction in the first lateral stretching step is represented by Sa, and the stretching speed in the width direction in the N-th lateral stretching step is represented by Sb, the value of the stretching speed ratio Sb/Sa is preferably 1.5 to 6.

In the lateral stretching step, lateral stretching is preferably performed at a stretching stress of 8 MPa to 20 MPa and a stretching ratio of 3.4 times to 5 times, and more preferably a stretching stress of 10 MPa to 18 MPa and a stretching ratio of 3.6 times to 4.5 times.

The stretching area magnification (longitudinal stretching ratio×lateral stretching ratio) of the above-described biaxial stretching is preferably 9 times or greater and 20 times or less. In a case where the area magnification is 9 times or greater and 20 times or less, for example, a base film is obtained which is a biaxially-oriented polyester film having a thickness of 250 μm to 500 μm after the stretching, a high surface orientation degree, a crystallization degree of 30% to 40%, an equilibrium moisture content of 0.1 mass % to 0.25 mass %, and containing titanium oxide particles.

The stretching area magnification of the biaxial stretching is more preferably 10 times or greater and 20 times or less, and even more preferably 12 times or greater and 20 times or less.

As a biaxial stretching method, any one of a sequential biaxial stretching method in which stretching in a length direction and stretching in a width direction are separately performed as described above, or a simultaneous biaxial stretching method in which stretching in a length direction and stretching in a width direction are simultaneously performed may be used.

For example, in a case where the stretching speed in a width direction is constant, and first to N-th longitudinal stretching steps are performed in a length direction, the stretching temperature, the stretching speed, and the stretching speed ratio in the first to N-th lateral stretching steps in the width direction described above can be similarly applied.

(Step of Performing Thermal Fixing Treatment on Base Film after Stretching)

Next, the biaxially-stretched polyester film (that is, base film) is preferably subjected to a thermal fixing step (step (III)).

In the step (III), for example, the film is preferably heat-treated at 160° C. to 230° C., and preferably 170° C. to 220° C. (more preferably 180° C. to 210° C.) for 1 second to 60 seconds (more preferably 5 seconds to 50 seconds).

In a case where the thermal fixing temperature is 160° C. or higher, the polyester is likely to crystallize, the polyester molecules can be fixed in an extended state, and hydrolysis resistance can be increased. In a case where the thermal fixing temperature is 230° C. or lower, slippage hardly occurs at a portion where the polyester molecules are entangled with each other, contraction of the polyester molecules can be suppressed, and hydrolysis resistance can be increased.

The thermal fixing temperature mentioned herein is the surface temperature of the film in the thermal fixing treatment.

In the step (III) which is optionally provided after the stretching step, a part of the volatile basic compound having a boiling point of 200° C. or lower may be volatilized.

The step (III) is preferably performed in a state in which the film is held by chucks in the tenter after the lateral stretching. In this case, the interval between the chucks may be the same as the width when the lateral stretching is ended. Otherwise, the interval may be widened or narrowed. By performing the thermal fixing treatment, microcrystals are formed, and mechanical characteristics and durability can be improved.

(Step of Thermally Relaxing Base Film)

A step (IV) of thermally relaxing the base film is preferably performed after the step (III) of performing the thermal fixing treatment on the base film.

The thermal relaxation treatment in the step (IV) is a treatment of applying heat for stress relaxation to the film, thereby contracting the film. In the step (IV), relaxation is preferably performed in at least one of the longitudinal direction or the lateral direction, and the relaxation amount is preferably 1% to 30% (ratio of the width after lateral stretching), more preferably 2% to 20%, and even more preferably 3% to 15% in both longitudinal and lateral directions. In a case where the thermal relaxation temperature is represented by Tr, and the thermal fixing temperature is represented by Ts, the thermal relaxation temperature Tr is preferably within a temperature region ($100°\ C.\leq Tr\leq Ts-15°\ C.$) which is not lower than 100° C. and lower than Ts by at least 15° C., more preferably within a temperature region ($110°\ C.\leq Tr\leq Ts-25°\ C.$) which is not lower than 110° C. and lower than Ts by at least 25° C., and particularly preferably within a temperature region ($120°\ C.\leq Tr\leq Ts-30°\ C.$) which is not lower than 120° C. and lower than Ts by at least 30° C.

In a case where the polyester film is thermally relaxed under conditions within the above-described range in the step (IV) to slightly relax the tension of the polyester molecules, dimensional stability is improved while hydrolysis resistance is maintained, and thus defects are less likely to occur in the steps performed on the downstream side of the processing of the obtained polyester film.

Lateral relaxation can be performed by reducing the width of the clip of the tenter. In addition, longitudinal relaxation can be performed by narrowing the interval between the adjacent clips of the tenter. This can be achieved by connecting the adjacent clips in a pantograph shape and contracting the pantograph. In addition, after the film is released from the tenter, it can be relaxed by a heat treatment while being transported with a low tension. The tension is preferably 0 $N/mm^2$ to 0.8 $N/mm^2$, more preferably 0 $N/mm^2$ to 0.6 $N/mm^2$, and even more preferably 0 $N/mm^2$ to 0.4 $N/mm^2$ per cross-sectional area of the film. 0 $N/mm^2$ can be achieved by providing two pairs or more of nip rolls in the transportation and loosening the film (in a suspended state) between the nip rolls.

(Step of Winding Base Film)

The film released from the tenter is trimmed at both ends held by the clips, subjected to knurling processing (embossing) at both ends, and then wound.

The width of the film to be wound is preferably 0.8 m to 10 m, more preferably 1 m to 6 m, and even more preferably 1.2 m to 4 m. The thickness is preferably 30 µm to 500 µm, more preferably 40 µm to 480 µm, and even more preferably 45 µm to 450 µm. Such thickness adjustment can be achieved by adjusting the discharge amount of the extruder or adjusting the film forming speed (adjusting the speed of the cooling roll, the stretching speed interlocking with the speed of the cooling roll, and the like).

The edge portion of the trimmed film or the like can be used as a film for reproduction. Therefore, the edge portion can be recovered as a resin mixture and recycled. The film for reproduction becomes a film raw material for a white polyester film of the next lot, and returns to the drying step described above, and the manufacturing steps are repeated in order.

Through the above steps, it is possible to manufacture the base film of the polyester film according to the embodiment of the present disclosure.

[Step (II)]

(Formation of Image Receiving Layer)

The image receiving layer can be formed as follows: for example, a coating liquid composition for forming an image receiving layer obtained by dissolving or dispersing a resin, a crosslinking agent, a surfactant, and the like in a solvent or a dispersion medium is coated on at least one surface of a base film obtained by the above-described method, and dried by heating. Examples of the solvent or the dispersion medium include water, an organic solvent, and a mixture thereof. The solvents or the dispersion mediums may be used singly, or two or more types thereof may be used.

The coating liquid composition for forming an image receiving layer may be prepared depending on the type of the resin for forming an image receiving layer, and can use an organic solvent or water as a solvent. From the viewpoint of reducing an environmental load and the like, the coating liquid composition for forming an image receiving layer is preferably a resin particle dispersion which uses water as a solvent and contains a resin in the form of emulsion particles.

The method of coating the base film with the coating liquid composition for forming an image receiving layer is not particularly limited, and the coating liquid composition for forming an image receiving layer can be applied using a known coating method such as an air doctor coater, a blade coater, a rod coater, a knife coater, a squeeze coater, a reverse roll coater, or a bar coater.

The surface of the base film on a side on which the image receiving layer is formed is preferably previously subjected to a surface treatment such as a corona discharge treatment, a plasma treatment, a flame treatment, and an ultraviolet irradiation treatment, in order to improve adhesion between the base film and the image receiving layer.

In a case where an antistatic layer is provided on the outermost surface of the image receiving layer, it may be formed on the surface of the base film or on the surface of the fixing layer provided adjacent to the base.

The antistatic layer can be formed as follows: for example, an aqueous dispersion (that is, a coating liquid composition for forming an antistatic layer) containing a resin, at least one conductive material selected from conductive particles or a conductive polymer, a crosslinking agent, and the like is coated on a surface of a resin-containing image receiving layer provided adjacent to the base, and then dried by heating.

The coating liquid composition for forming an antistatic layer may be prepared depending on the type of the resin or the conductive material for forming an antistatic layer, and can use an organic solvent or water as a solvent. From the viewpoint of reducing an environmental load and the like, the coating liquid composition for forming an antistatic layer is preferably an emulsion composition which uses water as a solvent and contains resin particles and a conductive material in the form of particles.

The method of coating with the coating liquid composition for forming an antistatic layer is not particularly limited, and the coating can be performed using a known coating method such as an air doctor coater, a blade coater, a rod coater, a knife coater, a squeeze coater, a reverse roll coater, a wire bar coater, or a bar coater.

The drying by heating is performed by performing drying preferably at 90° C. to 200° C. for 0.1 minutes to 10 minutes, and more preferably 130° C. to 200° C. for 0.5 minutes to 5 minutes by, for example, a hot air dryer.

The total thickness of the polyester film according to the embodiment of the present disclosure including at least the base film and the image receiving layer described above is preferably within a range of 70 μm to 400 μm, and more preferably 100 μm to 300 μm from the viewpoint of concealability and handleability during printing.

<Properties of Polyester Film>

Preferable properties of the polyester film according to the embodiment of the present disclosure are as follows.

(Optical Density)

The polyester film according to the embodiment of the present disclosure preferably has an optical density of 0.5 or greater, more preferably 0.8 or greater, and even more preferably 0.9 or greater.

The optical density of the polyester film can be measured using a reflection densitometer "X-Rite 538" (manufactured by X-Rite, Inc.).

(Whiteness)

In the polyester film according to the embodiment of the present disclosure, the whiteness measured from the image receiving layer side is preferably 50% or greater, more preferably 80% or greater, and even more preferably 90% or greater.

The whiteness can be measured by the following method.

The whiteness of the polyester film is measured using a color chromaticity meter CR-400 (manufactured by Konica Minolta, Inc.) under the measurement conditions of a C-light source and a 2° visual field with AL/PET 30-188 (PANAC Corporation) provided as a lowermost layer according to ASTM E313.

(Total Light Ray Transmittance)

The total light ray transmittance of the polyester film according to the embodiment of the present disclosure is preferably 11% or less, and more preferably 12% or less from the viewpoint of suppression of show-through and excellent concealability.

The total light ray transmittance of the polyester film can be measured according to JIS K7361-1 (1997) using HR-100 manufactured by MURAKAMI COLOR RESEARCH LABORATORY CO., Ltd.

(Glossiness)

The 20° glossiness of the polyester film according to the embodiment of the present disclosure is preferably 35 or greater, more preferably 40 or greater, and even more preferably 60 or greater.

The 60° glossiness is preferably 65 or greater, more preferably 70 or greater, and even more preferably 80 or greater.

The glossiness of the polyester film can be measured using a digital variable angle gloss meter (Suga Test Instruments Co., Ltd., UGV-5D, measurement hole: 8 mm).

The measurement is performed under conditions of an incidence angle of 20°, light reception at 20° and an incidence angle of 60°, and light reception at 60°.

(Surface Resistivity)

In the polyester film according to the embodiment of the present disclosure, the surface resistivity on a side on which the image receiving layer and the antistatic layer are provided (hereinafter, may be referred to as "image receiving side surface resistivity") is preferably $10^7$ Ω/sq to $10^{10}$ Ω/sq. In a case where the image receiving side surface resistivity is $10^7$ Ω/sq or higher, electrophotographic image formation can be performed, and in a case where the image receiving side surface resistivity is $10^{10}$ Ω/sq or lower, accumulation (charging) of static electricity can be effectively suppressed. From such a viewpoint, the image receiving side surface resistivity of the image receiving sheet according to this embodiment is more preferably $10^{7.1}$ Ω/sq to $10^{9.5}$ Ω/sq, and even more preferably $10^{7.2}$ Ω/sq to $10^{8.8}$ Ω/sq.

In a case where an image receiving layer including a fixing layer and an antistatic layer is formed on both surfaces of a base film, the surface resistivity of the both surfaces of the image receiving layer is preferably $10^7$ Ω/sq to $10^{10}$ Ω/sq, more preferably $10^{7.1}$ Ω/sq to $10^{9.5}$ Ω/sq, and even more preferably $10^{7.2}$ Ω/sq to $10^{8.8}$ Ω/sq.

The surface resistivity (hereinafter, may be abbreviated as "SR") on the image receiving layer side of the polyester film according to the embodiment of the present disclosure is a value obtained by applying 100 V by using a digital electrometer (8252, manufactured by ADC Corporation) and RESISTIVITY CHAMBER (12704A, manufactured by ADC Corporation) under the environment of 25° C. and 20% RH, and calculating surface resistivity from the current value after 60 seconds.

On the surface of the base film on a side on which the image receiving layer is not provided (hereinafter, may be referred to as "back surface" or "second surface"), an image receiving layer which may have an antistatic layer may be provided in the same manner as in the first surface.

In the polyester film according to the embodiment of the present disclosure, in a case where an image is not formed on the back surface side, a back surface side antistatic layer for preventing charging on the back surface side and a back surface side flattening layer for flattening the back surface side may be provided.

EXAMPLES

Hereinafter, the above-described embodiments will be described in more detail using examples, but are not limited to the following examples. Unless otherwise specified, "part" is on a mass basis.

Example 1

[Preparation of Base Film]
<Synthesis of Raw Material Polyester Resin 1>
As shown below, a terephthalic acid and an ethylene glycol were directly reacted with each other to distill water away, and were esterified. After that, a polyester resin (titanium (Ti) catalyst-based PET) was obtained with a continuous polymerization device using a direct esterification method in which polycondensation was performed under reduced pressure.

(1) Esterification Reaction

In a first esterification reaction tank, 4.7 tons of a high purity terephthalic acid and 1.8 tons of an ethylene glycol were mixed for 90 minutes to form a slurry, and the slurry was continuously supplied to the first esterification reaction tank at a flow rate of 3,800 kg/h. Furthermore, an ethylene glycol solution of citric acid chelated titanium complex (VERTEC AC-420, manufactured by Johnson Matthey) in which a citric acid coordinated with a Ti metal was continuously supplied, and a reaction was caused under continuous stirring at an inner temperature of the reaction tank of 250° C. for an average residence time of approximately 4.3 hours. In this case, the citric acid chelated titanium complex was continuously added such that the amount of Ti added reached 9 ppm in terms of element equivalent value. The acid value of the obtained oligomer was 600 equivalents/ton.

In the present specification, the acid value of the oligomer is a value measured by the following method.

That is, 0.1 g of a measurement sample is dissolved in 10 ml of a benzyl alcohol, and then a chloroform is added thereto to obtain a mixed solution. A phenol red indicator is added dropwise to the mixed solution. The obtained solution is titrated with a reference liquid (0.1 mol/L KOH-benzyl alcohol mixed solution), and the acid value is obtained from the dropping amount.

The obtained reaction product (oligomer) was transferred to a second esterification reaction tank, and reacted under stirring at an inner temperature of the reaction tank of 250° C. for an average residence time of 1.2 hours, and thus an oligomer having an acid value of 200 equivalents/ton was obtained. The inside of the second esterification reaction tank was divided into three zones. An ethylene glycol solution of magnesium acetate was continuously supplied from a second zone such that the amount of magnesium (Mg) added reached 75 ppm in terms of element equivalent value, and subsequently, an ethylene glycol solution of trimethyl phosphate was continuously supplied from a third zone such that the amount of phosphorus (P) added reached 65 ppm in terms of element equivalent value.

(2) Polycondensation Reaction

The esterification reaction product obtained as described above was continuously supplied to a first polycondensation reaction tank and polycondensed under stirring at a reaction temperature of 270° C. and an inner pressure of the reaction tank of 20 torr ($2.67 \times 10^{-3}$ MPa) for an average residence time of approximately 1.8 hours.

The reaction product which had passed through the first polycondensation reaction tank was further transferred to a second polycondensation reaction tank, and reacted (polycondensed) in the reaction tank under stirring at an inner temperature of the reaction tank of 276° C. and an inner pressure of the reaction tank of 5 torr ($6.67 \times 10^4$ MPa) for an average residence time of approximately 1.2 hours.

Next, the reaction product which had passed through the second polycondensation reaction tank was further transferred to a third polycondensation reaction tank, and reacted (polycondensed) in the reaction tank under conditions of an inner temperature of the reaction tank of 278° C., an inner pressure of the reaction tank of 1.5 torr ($2.0 \times 10^{-4}$ MPa), and an average residence time of 1.5 hours. Thus, a polyethylene terephthalate (PET) was obtained. The measurement was performed on the obtained PET (reaction product) using high resolution type high frequency inductively coupled plasma mass spectrometry (HR-ICP-MS; AttoM manufactured by Seiko Instruments Inc.). As a result, titanium (Ti) was 9 ppm, magnesium (Mg) was 67 ppm, and phosphorus (P) was 58 ppm. P was slightly reduced with respect to the original amount added, and was assumed to have been volatilized in the polymerization process.

—Solid Phase Polymerization—

The PET polymerized as described above was pelletized (diameter: 3 mm, length: 7 mm), and the obtained resin pellets (intrinsic viscosity IV=0.60 dL/g, concentration of terminal carboxyl groups=16 equivalents/ton) were subjected to solid phase polymerization as follows to obtain a polyester (PET-1).

In the solid phase polymerization, the polyester polymerized by the above-described esterification reaction was heated for 7 minutes at 140° C. using nitrogen having a dew-point temperature of −30° C., and preliminary crystallization was performed to prevent fixation during the solid phase polymerization.

Next, the polyester was dried for 7 hours at 180° C. using heated nitrogen having a dew-point temperature of −30° C. to adjust the moisture content in the resin to 50 ppm or less.

Next, the dried polyester resin was preliminarily heated at 210° C., and then nitrogen was circulated at 195° C. for 75 hours, thereby allowing solid phase polymerization to proceed. Regarding nitrogen circulation conditions, the gas ratio (the amount of the nitrogen gas to be circulated with respect to the amount of the resin to be discharged) was set to 1.3 m$^3$/kg, the superficial velocity was set to 0.08 m/sec, the concentration of ethylene glycol was set to 240 ppm, the water concentration was set to 12 ppm, and nitrogen in which the molar partial pressure ratio of ethylene glycol to water (the molar partial pressure of ethylene glycol/the molar partial pressure of water) was 20 was used to allow the solid phase polymerization to proceed. In order to obtain the above-described mixed gas composition, a high purity ethylene glycol having a moisture content of 100 ppm was used as an ethylene glycol scrubber, and the temperature of the scrubber was set to 35° C. The pressure in the scrubber was set within a range of 0.1 MPa to 0.11 MPa.

Next, the resin (750 kg/h) discharged from the reaction step was cooled to 60° C. In the obtained polyester resin after the solid phase polymerization, the intrinsic viscosity (IV) was 0.85 dL/g, and the amount of terminal COOH groups (AV) was 6 equivalents/ton.

<Preparation of Master Pellets>

Titanium oxide particles were added to and kneaded with a part of the resin pellets before the solid phase polymerization such that the content ratio thereof reached 50 mass % of the entire pellets, and master pellets (master batch) were prepared.

Here, as the titanium oxide particles, titanium oxide particles manufactured by Ishihara Sangyo Kaisha, Ltd. (trade name: PF-739; average primary particle size=0.25 μm) were used.

<Formation of Un-Stretched Film>

The PET-1 obtained through the solid phase polymerization as described above and the master pellets containing titanium oxide particles were dried such that the moisture contents thereof reached 100 ppm or less respectively, mixed such that the content of the titanium oxide particles reached 13 mass %, injected into a hopper of a kneading extruder, melted at 290° C., and extruded. Meanwhile, as the extruder, a double-vented identical direction rotary engagement type biaxial extruder (diameter: 110 mm) comprising vents at two places was used. The molten substance (melt) prepared in the extruder was passed through a gear pump and a filter (pore diameter: 20 μm), and then extruded from a die to a cooling cast drum (cooling roll). The extruded melt was adhered to the cooling cast drum using a static electricity application method. Accordingly, an un-stretched polyethylene terephthalate (PET) film having a thickness of approximately 1.5 mm and containing titanium oxide particles was formed.

<Stretching of Un-Stretched Film>
—Longitudinal (MD) Stretching—

The un-stretched film was passed through between two pairs of nip rolls having different circumferential velocities, and stretched in the longitudinal direction (transportation direction) under the following conditions. Here, the stretching speed in the longitudinal stretching step is expressed as a rate of increase of the length in the length direction of the un-stretched film per second.

Preheating Temperature: 80° C.
Stretching Temperature: 90° C.
Stretching Ratio: 3.4 times
Stretching Speed: 300%/sec —Lateral (TD) Stretching—

After the longitudinal stretching, lateral stretching was performed. The lateral stretching was performed by increasing the stretching temperature and the stretching speed in three stages. Specific conditions thereof are as follows. Here, the stretching speed in the lateral stretching step is expressed as a rate of increase of the width of the film after the longitudinal stretching and before the first lateral stretching step per second.

Preheating Temperature: 110° C.
Stretching Temperature Immediately After Start of Lateral Stretching (first lateral stretching step): 110° C.
Stretching Speed Immediately After Start of Lateral Stretching (first lateral stretching step): 4.2%/sec
Stretching Temperature in Middle of Lateral Stretching (second lateral stretching step): 130° C.
Stretching Speed in Middle of Lateral Stretching (second lateral stretching step): 11%/sec
Stretching Temperature Immediately Before End of Lateral Stretching (third lateral stretching step): 145° C.
Stretching Speed Immediately Before End of Lateral Stretching (third lateral stretching step): 25%/sec
Lateral Stretching Ratio (total): 4.4 times —Thermal Fixing and Thermal Relaxation—

The biaxially stretched film (stretching ratio: 15.0) which had been subjected to the longitudinal stretching and the lateral stretching was thermally fixed at 190° C. (heat fixing time: 10 seconds).

After the thermal fixing, heat relaxation was performed by contracting a tenter width (thermal relaxation temperature: 160° C.).

—Winding—

After the thermal fixing and the thermal relaxation, both ends were respectively trimmed 10 cm. After that, both ends were embossed (knurled) in a width of 10 mm, and then the film was wound with a tension of 25 kg/m. The film width was 1.5 m, and the winding length was 2,000 m.

In the above-described manner, a biaxially stretched white polyester film as a base film was obtained.

[Formation of Image Receiving Layer]

Coating liquid compositions, each having the following composition for forming a layer, were prepared.

—Coating Liquid for Forming Fixing Layer—
Water 420 parts by mass
Polyolefin Emulsion (ARROW BASE (registered trademark) SE1013N, Unitika Ltd., solid content: 20 mass %) 268 parts by mass
Acrylic Emulsion (AQUABRID (registered trademark) AS563, DAICEL FINECHEM LTD., solid content: 28 mass %) 140 parts by mass
Oxazoline Crosslinking Agent (EPOCROS (registered trademark) WS700, Nippon Shokubai Co., Ltd., solid content: 25 mass %) 168 parts by mass
Surfactant (sodium=1.2-{bis(3,3,4,4,5,5,6,6,6-nonafluorohexylcarbonyl)} ethanesulfonate, solid content: 2 mass %) 4.3 parts by mass —Coating Liquid Composition for Forming Antistatic Layer—
Water 491 parts by mass
Polyolefin Emulsion (ARROW BASE (registered trademark) SE1013N, Unitika Ltd., solid content: 20 mass %) 169 parts by mass
Acrylic Emulsion (AQUABRID (registered trademark) AS563, DAICEL FINECHEM LTD., solid content: 28 mass %) 30 parts by mass
Oxazoline Crosslinking Agent (EPOCROS (registered trademark) WS700, Nippon Shokubai Co., Ltd., solid content: 25 mass %) 43 parts by mass
Surfactant (sodium=1.2-{bis(3,3,4,4,5,5,6,6,6-nonafluorohexylcarbonyl)} ethanesulfonate, solid content: 2 mass %) 2.4 parts by mass
Surfactant (NAROACTY (registered trademark) CL95, SANYO CHEMICAL INDUSTRIES, LTD., solid content: 1 mass %) 10 parts by mass
Conductive Particles (FT-1000 (trade name), Ishihara Sangyo Kaisha, Ltd., average particle size: 0.13 μm (short axis), 1.68 μm (long axis)) 255 parts by mass The conductive particles are written as "antistatic particles" in the following tables. This is also applied to the following conductive particles.

<Formation of Image Receiving Layer>

First, one surface of the base film obtained as described above was coated with a coating liquid for forming a fixing layer at 34 mL/m$^2$, and the coating liquid was dried at 150° C. to form a fixing layer.

The formed fixing layer was coated with a coating liquid for forming an antistatic layer at 3.7 mL/m$^2$, and the coating liquid was dried at 150° C. to form an antistatic layer. An image receiving layer having a layered structure was formed on the surface of the base film.

Accordingly, a polyester film of Example 1 was obtained.

Examples 2 to 23 and Comparative Examples 1 to 9

Polyester films of Examples 2 to 23 and Comparative Examples 1 to 9 were prepared in the same manner as in Example 1, except that the stretching conditions, the film properties, the configuration of the image receiving layer, the conductive particles to be used were changed as shown in Tables 1, 3, 5, and 7.

(Base Film)

Base films to be used in Examples 2 to 23 and Comparative Examples 1 to 9 were prepared in the same manner as in Example 1, except that the stretching conditions and the film properties were changed as shown in Tables 1, 3, 5, and 7.

In the method of synthesizing a raw material polyester resin used in Comparative Example 9, nitrogen circulation for 25 hours, 0.68 dl/g of IV, and 12 equivalents/ton of AV were set.

The base film of Comparative Example 8 was broken when the stretching ratio was 17.0 times, and the base film of Comparative Example 9 was broken when the stretching ratio was 15.0 times. Therefore, subsequent evaluation was not performed.

In Example 17, the longitudinal×lateral stretching ratio was 3.4 times×4.0 times (stretching ratio: 13.6). In Example 18, the longitudinal×lateral stretching ratio was 3.0 times× 4.0 times (stretching ratio: 12.0). In Comparative Example 7, the longitudinal×lateral stretching ratio was 2.8 times×3.6 times (stretching ratio: 10.0). The thickness of the un-stretched film is equal to the value of the thickness of the base film after stretching×the stretching ratio.

Details of other titanium oxide particles used in the examples and the comparative examples are as follows.

PF-691 (trade name; Ishihara Sangyo Kaisha, Ltd., average primary particle size=0.21 μm)

CR-58-2 (trade name; Ishihara Sangyo Kaisha, Ltd., average primary particle size=0.28 μm)

R-38L (trade name; SAKAI CHEMICAL INDUSTRY CO., LTD., average primary particle size=0.40 μm)

TY-200 (trade name; Ishihara Sangyo Kaisha, Ltd., average primary particle size=0.7 μm)

Catalog values are employed as average particle sizes of titanium oxide particles. Regarding samples without catalog values, the average particle size was measured by the above-described method.

Details of other conductive particles used in the examples and the comparative examples are as follows.

FS-10D (trade name; Ishihara Sangyo Kaisha, Ltd., solid content: 17 mass %, aqueous dispersion of Sb-doped acicular $SnO_2$, average particle size: 0.01 μm (short axis), 0.02 μm (long axis))

FT-3000 (trade name; Ishihara Sangyo Kaisha, Ltd., average particle size: 0.27 μm (short axis), 5.15 μm (long axis))

Catalog values are employed as average particle sizes of conductive particles. Regarding samples without catalog values, the average particle size was measured by the above-described method. In a case where the conductive particles are not spherical, the average particle size (average minor axis) of minor axes of the particles is measured and described in Tables 1, 3, 5, and 7.

[Evaluation of Polyester Film]

The polyester films obtained in the examples and the comparative examples were evaluated as follows. The respective measurement results and evaluation results are shown in the following Tables 2, 4, 6, and 8.

<Area of Void>

The area per void in the base film was evaluated by the following method.

1. A manufactured polyester film is cut in a thickness direction along TD and MD of the film with a microtome.

2. The cut surface in each direction is observed with a scanning electron microscope at a magnification of 3,000 times. 9 or more images are randomly taken in one direction to obtain cross-sectional images of the polyester film.

3. Using image analysis software (ImageJ), places where peeling from a white pigment occurs and void gaps are formed between titanium oxide particles and a polyester are found from the obtained image, and tracing is performed along the outlines of the voids. In this case, a void includes a portion of the titanium oxide particles present in the void, and a portion where the titanium oxide particles fall from the void and only the cavity is present in 1 and 2 is also similarly traced. In addition, in a case where voids overlap each other, these are traced together.

4. Next, the traced frame is filled.

5. The image in which the voids are traced and filled is binarized for division into a void portion and a polyester portion.

6. In an area calculation mode, the number of pixels of the void is obtained and converted into an area.

7. The number of voids is counted from the image obtained in 2.

8. Other images are also subjected to 6 and 7.

The total area obtained in 8 is divided by the number of voids obtained in 8 to obtain the area per void in each direction.

10. Finally, an average of the area per void in TD and the area per void in MD is obtained and defined as an average area per void.

<Thickness of Base Film>

The thickness of the base film is an average thickness of the base film measured using a contact type film thickness measurement instrument (manufactured by Mitutoyo Corporation, ID-F125). Specifically, using the contact type film thickness measurement instrument, 50 points are sampled at equal intervals in a length of 0.5 m in the length direction of the base film, 50 points are sampled at equal intervals (points that evenly divide the film in the width direction into 50 parts) throughout the entire width of the formed film in the width direction, and the thicknesses at these 100 points are measured. The average of the obtained thicknesses at the 100 points is obtained and defined as the thickness of the base film.

Regarding the thickness of the base film from which the image receiving layer cannot be peeled, a cut surface in the thickness direction of the obtained polyester film is observed with a scanning electron microscope at a magnification of 500 times, and an interface between the image receiving layer and the base film is observed. Using software added to the microscope, the thickness of the base film and an average thereof are calculated, and the obtained value is defined as the thickness of the base film.

<Thickness of Image Receiving Layer>

A cut surface in the thickness direction of the obtained polyester film is observed with a scanning electron microscope at a magnification of 500 times, and an interface between the image receiving layer and the base film is observed. Using software added to the microscope, the thickness of the image receiving layer and an average thereof are calculated, and the obtained value is defined as the thickness of the image receiving layer.

<Surface Roughness Standard Deviation Rq of Base Film and Image Receiving Layer>

Surface roughness standard deviations Rq (0) and Rq (1) were measured using a surface roughness measuring instrument "SURFTEST-500" (trade name) manufactured by Mitutoyo Corporation under standard conditions of the device.

The measurement sample was scanned in a length direction (MD) and in a width direction (TD), and the measurement was performed 5 times in each of the directions. The average of the obtained 10 numerical values was defined as the surface roughness standard deviations Rq (0) and Rq (1) in the present specification.

Rq (0) of the surface of the base film from which the image receiving layer could be peeled and Rq (1) of the surface of the image receiving layer were measured by the above-described method. The base film was subjected to the measurement after the image receiving layer was peeled therefrom.

In a case where it was difficult to peel the image receiving layer from the base film after the formation of the image receiving layer, the polyester film was cut in the thickness direction along MD and TD of the film with a microtome to obtain a cross section. In the cross section, the cut surface in each of TD and MD at the interface between the image receiving layer and the base film was observed with a scanning electron microscope at a magnification of 200 times, and 9 or more images were randomly taken in one direction to obtain cross-sectional images of the polyester film.

A curve of the interface between the image receiving layer and the base film in the obtained cross-sectional image was digitized using image analysis software (Spectrum Converter) under the following conditions. In a case where the interface between the image receiving layer and the base film was hardly seen, the image traced along the interface was subjected to the above-described process as necessary.

Evaluated Length: 1,250 μm
Sampling Pitch: 0.5 μm

From the image processing data obtained as described above, the surface roughness standard deviation Rq (0) was calculated. With this procedure, scanning was performed in the film length direction (MD) and in the width direction (TD), and the measurement was performed 5 times in each of the directions. The average of the obtained 10 numerical values was defined as the surface roughness standard deviation Rq (0) of the base film.

<Intrinsic Viscosity>

The obtained polyester film was dissolved in a mixed solvent of 1,1,2,2-tetrachloroethane/phenol (=2/3 [mass ratio]), and the intrinsic viscosity was obtained from the solution viscosity at 25° C. in the mixed solvent.

$$\eta sp/C = [\eta] + K[\eta]2 \cdot C$$

Here, ηsp is equal to (solution viscosity/solvent viscosity)-1. C represents the mass of the polymer dissolved in 100 ml of the solvent (set to 1 g/100 ml in the present measurement), and K represents the Huggis constant (set to 0.343). The solution viscosity and the solvent viscosity were respectively measured using an Ostwald viscometer.

<Glossiness>

The glossiness of the polyester film obtained in each example was measured from a side on which the image receiving layer was provided using a digital variable angle gloss meter (Suga Test Instruments Co., Ltd., UGV-5D, measurement hole: 8 mm).

The measurement was performed under conditions of an incidence angle of 20°, light reception at 20° and an incidence angle of 60°, and light reception at 60°.

In a case where the 20° glossiness is 35 or greater and the 60° glossiness is 65 or greater, the polyester film is judged to have practically sufficient glossiness. In a case where at least one of 20° glossiness of less than 35 or 60° glossiness of less than 65 is observed, the glossiness is evaluated to be insufficient.

<Total Light Transmittance>
(Total Light Ray Transmittance)

The total light ray transmittance of the polyester film of each example was measured according to JIS K7361-1 (1997) using HR-100 manufactured by MURAKAMI COLOR RESEARCH LABORATORY CO., Ltd., and was evaluated according to the following criteria.

In a case where the total light ray transmittance is 12% or less, the polyester film can obtain concealability without problem in practical use.

<Whiteness>

The whiteness of the polyester film of each example was measured using a color chromaticity meter CR-400 (manufactured by Konica Minolta, Inc.) under the measurement conditions of a C-light source and a 2° visual field with AL/PET 30-188 (PANAC Corporation) provided as a lowermost layer according to ASTM E313.

The following Tables 1, 3, 5, and 7 show the configurations of the films of the examples and the comparative examples, and the following Tables 2, 4, 6, and 8 show the evaluation results of the obtained films.

TABLE 1

| | Base Film | | | | | | |
|---|---|---|---|---|---|---|---|
| | Titanium Oxide Particles | | Properties of Base Film | | | | |
| | Type of Particles | Average Particle Size (μm) | Content (mass %) | Stretching Ratio | Thickness ($T^1$) (μm) | $1200/T^1$ | $(600/T^1) + 16$ | Intrinsic Viscosity (IV) (dL/g) |
| Example 1 | PF-739 | 0.25 | 13 | 15.0 | 100 | 12.0 | 22.0 | 0.8 |
| Example 2 | PF-739 | 0.25 | 15 | 15.0 | 100 | 12.0 | 22.0 | 0.8 |
| Example 3 | PF-739 | 0.25 | 18 | 15.0 | 100 | 12.0 | 22.0 | 0.8 |
| Example 4 | PF-739 | 0.25 | 8 | 15.0 | 180 | 6.7 | 19.3 | 0.8 |
| Example 5 | PF-739 | 0.25 | 11 | 15.0 | 180 | 6.7 | 19.3 | 0.8 |
| Example 6 | PF-739 | 0.25 | 15 | 15.0 | 180 | 6.7 | 19.3 | 0.8 |
| Example 7 | PF-739 | 0.25 | 19 | 15.0 | 180 | 6.7 | 19.3 | 0.8 |
| Example 8 | PF-739 | 0.25 | 6 | 15.0 | 250 | 4.8 | 18.4 | 0.8 |

| | Base Film | | | Image Receiving Layer | | |
|---|---|---|---|---|---|---|
| | Properties of Base Film | | | | Properties | |
| | Surface | | Particles | | Surface Roughness of | Thickness of Image |
| | Roughness of Base (μm) | Void Area (μm²/void) | Type of Antistatic Particles | Average Minor Axis (μm) | Outermost Layer (μm) | Receiving Layer (μm) |
| Example 1 | 0.05 | 0.070 | FT-1000 | 0.13 | 0.06 | 4.2 |
| Example 2 | 0.07 | 0.070 | FT-1000 | 0.13 | 0.06 | 4.2 |

TABLE 1-continued

|  | | | | | | |
|---|---|---|---|---|---|---|
| Example 3 | 0.10 | 0.070 | FT-1000 | 0.13 | 0.06 | 4.2 |
| Example 4 | 0.04 | 0.070 | FT-1000 | 0.13 | 0.06 | 4.2 |
| Example 5 | 0.06 | 0.070 | FT-1000 | 0.13 | 0.06 | 4.2 |
| Example 6 | 0.08 | 0.070 | FT-1000 | 0.13 | 0.06 | 4.2 |
| Example 7 | 0.10 | 0.070 | FT-1000 | 0.13 | 0.06 | 4.2 |
| Example 8 | 0.03 | 0.070 | FT-1000 | 0.13 | 0.06 | 4.2 |

TABLE 2

| | Performance Evaluation | | | | |
|---|---|---|---|---|---|
| | 20° Glossiness | 60° Glossiness | Total Light Ray Transmittance (%) | Optical Density | Whiteness (%) |
| Example 1 | 70 | 107 | 10.9 | 0.87 | 78 |
| Example 2 | 57 | 96 | 9.3 | 0.93 | 84 |
| Example 3 | 42 | 74 | 6.9 | 1.03 | 93 |
| Example 4 | 73 | 114 | 9.8 | 0.89 | 80 |
| Example 5 | 63 | 107 | 7.3 | 0.99 | 89 |
| Example 6 | 48 | 92 | 4.1 | 1.12 | 101 |
| Example 7 | 39 | 77 | 1.0 | 1.25 | 112 |
| Example 8 | 74 | 121 | 9.5 | 0.99 | 80 |

TABLE 4

| | Performance Evaluation | | | | |
|---|---|---|---|---|---|
| | 20° Glossiness | 60° Glossiness | Total Light Ray Transmittance (%) | Optical Density | Whiteness (%) |
| Example 9 | 64 | 113 | 6.2 | 1.12 | 91 |
| Example 10 | 44 | 95 | 2.2 | 1.28 | 106 |
| Example 11 | 39 | 87 | 0.8 | 1.38 | 115 |
| Example 12 | 68 | 111 | 9.0 | 0.99 | 89 |
| Example 13 | 55 | 99 | 7.3 | 0.99 | 89 |
| Example 14 | 41 | 80 | 7.3 | 0.99 | 89 |
| Example 15 | 63 | 107 | 7.3 | 0.99 | 89 |

TABLE 3

| | Base Film | | | | | | |
|---|---|---|---|---|---|---|---|
| | Titanium Oxide Particles | | Properties of Base Film | | | | |
| | Type of Particles | Average Particle Size (μm) | Content (mass %) | Stretching Ratio | Thickness ($T^1$) (μm) | $1200/T^1$ | $(600/T^1) + 16$ | Intrinsic Viscosity (IV) (dL/g) |
| Example 9 | PF-739 | 0.25 | 10 | 15.0 | 250 | 4.8 | 18.4 | 0.8 |
| Example 10 | PF-739 | 0.25 | 15 | 15.0 | 250 | 4.8 | 18.4 | 0.8 |
| Example 11 | PF-739 | 0.25 | 18 | 15.0 | 250 | 4.8 | 18.4 | 0.8 |
| Example 12 | PF-691 | 0.21 | 11 | 15.0 | 180 | 6.7 | 19.3 | 0.8 |
| Example 13 | CR-58-2 | 0.28 | 11 | 15.0 | 180 | 6.7 | 19.3 | 0.8 |
| Example 14 | R-38L@ SAKAI CHEMICAL INDUSTRY CO., LTD. | 0.40 | 11 | 15.0 | 180 | 6.7 | 19.3 | 0.8 |
| Example 15 | PF-739 | 0.25 | 11 | 15.0 | 180 | 6.7 | 19.3 | 0.8 |

| | Base Film | | Image Receiving Layer | | |
|---|---|---|---|---|---|
| | Properties of Base Film | | Particles | | Properties |
| | Surface Roughness of Base (μm) | Void Area (μm²/void) | Type of Antistatic Particles | Average Minor Axis (μm) | Surface Roughness of Outermost Layer (μm) | Thickness of Image Receiving Layer (μm) |
| Example 9 | 0.05 | 0.070 | FT-1000 | 0.13 | 0.06 | 4.2 |
| Example 10 | 0.08 | 0.070 | FT-1000 | 0.13 | 0.06 | 4.2 |
| Example 11 | 0.09 | 0.070 | FT-1000 | 0.13 | 0.06 | 4.2 |
| Example 12 | 0.05 | 0.070 | FT-1000 | 0.13 | 0.06 | 4.2 |
| Example 13 | 0.07 | 0.070 | FT-1000 | 0.13 | 0.06 | 4.2 |
| Example 14 | 0.10 | 0.070 | FT-1000 | 0.13 | 0.06 | 4.2 |
| Example 15 | 0.06 | 0.070 | FS-10D | 0.02 | 0.06 | 4.2 |

TABLE 5

| | Base Film | | | | | | | |
|---|---|---|---|---|---|---|---|---|
| | Titanium Oxide Particles | | | Properties of Base Film | | | | |
| | Type of Particles | Average Particle Size (μm) | Content (mass %) | Stretching Ratio | Thickness ($T^1$) (μm) | $1200/T^1$ | $(600/T^1) + 16$ | Intrinsic Viscosity (IV) (dL/g) |
| Example 16 | PF-739 | 0.25 | 11 | 15.0 | 180 | 6.7 | 19.3 | 0.8 |
| Example 17 | PF-739 | 0.25 | 11 | 13.6 | 180 | 6.7 | 19.3 | 0.8 |
| Example 18 | PF-739 | 0.25 | 11 | 12.0 | 180 | 6.7 | 19.3 | 0.8 |
| Example 19 | PF-739 | 0.25 | 21 | 15.0 | 70 | 17.1 | 24.6 | 0.8 |
| Example 20 | PF-739 | 0.25 | 6 | 15.0 | 300 | 4.0 | 18.0 | 0.8 |
| Example 21 | PF-739 | 0.25 | 15 | 15.0 | 100 | 12.0 | 22.0 | 0.8 |
| Example 22 | PF-739 | 0.25 | 11 | 15.0 | 180 | 6.7 | 19.3 | 0.8 |
| Example 23 | PF-739 | 0.25 | 10 | 15.0 | 250 | 4.8 | 18.4 | 0.8 |

| | Base Film | | Image Receiving Layer | | | |
|---|---|---|---|---|---|---|
| | Properties of Base Film | | Particles | | Properties | |
| | Surface Roughness of Base (μm) | Void Area (μm²/void) | Type of Antistatic Particles | Average Minor Axis (μm) | Surface Roughness of Outermost Layer (μm) | Thickness of Image Receiving Layer (μm) |
| Example 16 | 0.06 | 0.070 | FT-2000 | 0.21 | 0.10 | 4.2 |
| Example 17 | 0.06 | 0.052 | FT-1000 | 0.13 | 0.06 | 4.2 |
| Example 18 | 0.06 | 0.033 | FT-1000 | 0.13 | 0.06 | 4.2 |
| Example 19 | 0.10 | 0.070 | FT-1000 | 0.13 | 0.06 | 4.2 |
| Example 20 | 0.03 | 0.070 | FT-1000 | 0.13 | 0.06 | 4.2 |
| Example 21 | 0.07 | 0.070 | FS-10D | 0.02 | 0.06 | 4.2 |
| Example 22 | 0.06 | 0.070 | FS-10D | 0.02 | 0.06 | 4.2 |
| Example 23 | 0.05 | 0.070 | FS-10D | 0.02 | 0.06 | 4.2 |

TABLE 6

| | Performance Evaluation | | | | |
|---|---|---|---|---|---|
| | 20° Glossiness | 60° Glossiness | Total Light Ray Transmittance (%) | Optical Density | Whiteness (%) |
| Example 16 | 40 | 73 | 7.3 | 0.99 | 89 |
| Example 17 | 51 | 101 | 7.3 | 0.99 | 89 |
| Example 18 | 43 | 97 | 7.3 | 0.99 | 89 |
| Example 19 | 41 | 74 | 9.4 | 1.06 | 92 |
| Example 20 | 83 | 123 | 8.8 | 1.10 | 78 |
| Example 21 | 52 | 96 | 9.8 | 0.93 | 84 |
| Example 22 | 63 | 107 | 7.3 | 0.99 | 89 |
| Example 23 | 71 | 113 | 6.0 | 1.12 | 91 |

TABLE 7

| | Base Film | | | | | | | |
|---|---|---|---|---|---|---|---|---|
| | Titanium Oxide Particles | | | Properties of Base Film | | | | |
| | Type of Particles | Average Particle Size (μm) | Content (mass %) | Stretching Ratio | Thickness ($T^1$) (μm) | $1200/T^1$ | $(600/T^1) + 16$ | Intrinsic Viscosity (IV) (dL/g) |
| Comparative Example 1 | PF-739 | 0.25 | 10 | 15.0 | 100 | 12.0 | 22.0 | 0.8 |
| Comparative Example 2 | PF-739 | 0.25 | 23 | 15.0 | 100 | 12.0 | 22.0 | 0.8 |
| Comparative Example 3 | PF-739 | 0.25 | 5 | 15.0 | 180 | 6.7 | 19.3 | 0.8 |
| Comparative Example 4 | PF-739 | 0.25 | 3 | 15.0 | 250 | 4.8 | 18.4 | 0.8 |
| Comparative Example 5 | TY-200 | 0.70 | 11 | 15.0 | 180 | 6.7 | 19.3 | 0.8 |

TABLE 7-continued

| | | | | | | | | |
|---|---|---|---|---|---|---|---|---|
| Comparative Example 6 | PF-739 | 0.25 | 11 | 15.0 | 180 | 6.7 | 19.3 | 0.8 |
| Comparative Example 7 | PF-739 | 0.25 | 11 | 10.0 | 180 | 6.7 | 19.3 | 0.8 |
| Comparative Example 8 | PF-739 | 0.25 | 11 | 17.0 | 180 μm aimed | 6.7 | 19.3 | 0.8 |
| Comparative Example 9 | PF-739 | 0.25 | 11 | 15.0 | 180 μm aimed | 6.7 | 19.3 | 0.63 |

| | Base Film | | | | Image Receiving Layer | |
|---|---|---|---|---|---|---|
| | Properties of Base Film | | | | Properties | |
| | Surface | | Particles | | Surface Roughness of Outermost Layer (μm) | Thickness of Image Receiving Layer (μm) |
| | Roughness of Base (μm) | Void Area (μm²/void) | Type of Antistatic Particles | Average Minor Axis (μm) | | |
| Comparative Example 1 | 0.04 | 0.070 | FT-1000 | 0.13 | 0.06 | 4.2 |
| Comparative Example 2 | 0.12 | 0.070 | FT-1000 | 0.13 | 0.06 | 4.2 |
| Comparative Example 3 | 0.03 | 0.070 | FT-1000 | 0.13 | 0.06 | 4.2 |
| Comparative Example 4 | 0.03 | 0.070 | FT-1000 | 0.13 | 0.06 | 4.2 |
| Comparative Example 5 | 0.14 | 0.070 | FT-1000 | 0.13 | 0.06 | 4.2 |
| Comparative Example 6 | 0.06 | 0.070 | FT-3000 | 0.27 | 0.12 | 4.2 |
| Comparative Example 7 | 0.06 | 0.008 | FT-1000 | 0.13 | 0.06 | 4.2 |
| Comparative Example 8 | — | — | — | — | — | — |
| Comparative Example 9 | — | — | — | — | — | — |

TABLE 8

| | Performance Evaluation | | | | |
|---|---|---|---|---|---|
| | 20° Glossiness | 60° Glossiness | Total Light Ray Transmittance (%) | Optical Density | Whiteness (%) |
| Comparative Example 1 | 75 | 111 | 13.3 | 0.77 | 69 |
| Comparative Example 2 | 37 | 61 | 2.8 | 1.19 | 107 |
| Comparative Example 3 | 79 | 118 | 12.2 | 0.80 | 72 |
| Comparative Example 4 | 74 | 121 | 11.9 | 0.89 | 71 |
| Comparative Example 5 | 33 | 52 | 8.0 | 0.99 | 89 |
| Comparative Example 6 | 34 | 58 | 7.3 | 0.99 | 89 |
| Comparative Example 7 | 38 | 94 | 7.3 | 0.99 | 89 |
| Comparative Example 8 | Evaluation cannot be performed due to breakage | | | | |
| Comparative Example 9 | Evaluation cannot be performed due to breakage | | | | |

Since the conductive particles (antistatic particles in the above tables) contained in the image receiving layer are not spherical in any example, the average minor axis of the conductive particles is described in Tables 1, 3, 5, and 7.

It is found that the polyester films of the examples have excellent whiteness and glossiness, a high optical density, and low total light transmittance, and thus have excellent concealability. From this result, the polyester films of the examples can be expected to be used as an image recording medium which receives an ink image or a toner image.

The disclosure of Japanese Patent Application No. 2016-160684 filed on Aug. 18, 2016 is all incorporated into the present specification by reference.

All of publications, patent applications, and technical standards described in the present specification are incorporated into the present specification by reference as much as a case in which the respective publications, patent applications, and technical standards are specifically and respectively incorporated by reference.

What is claimed is:
1. A polyester film comprising:
a base film; and
at least one image receiving layer which is disposed on at least one surface of the base film,
wherein the base film contains a polyester and titanium oxide particles, the mass-based content of the titanium oxide particles in the base film satisfies Formulae 1-1 and 1-2 on the assumption that the thickness of the base film is $T^1$ μm, a surface roughness standard deviation Rq of a surface of the base film on which the image receiving layer is disposed is 0.01 μm to 0.12 μm, and a cross section in a thickness direction orthogonal to a plane direction of the base film has voids whose average area per void is 0.01 μm²/void to 0.10 μm²/void, and a surface roughness standard deviation Rq of an outermost surface of the image receiving layer is 0.01 μm to 0.1 μm, $$1200/T^1 \leq \text{Content of Titanium Oxide Particles in Base Film} \leq 600/T^1+16 \quad \text{Formula 1-1}$$

$$40 \leq T^1 \leq 400 \quad \text{Formula 1-2.}$$

2. The polyester film according to claim 1, wherein the mass-based content of the titanium oxide particles in the base film satisfies Formulae 2-1 and 2-2 on the assumption that the thickness of the base film is $T^2$ μm, $$1200/T^2+1 \leq \text{Content of Titanium Oxide Particles in Base Film} \leq 600/T^2+12 \quad \text{Formula 2-1}$$

$$60 \leq T^2 \leq 400 \quad \text{Formula 2-2.}$$

3. The polyester film according to claim 1, wherein the titanium oxide particles contained in the base film have an average particle size of 0.03 μm to 0.35 μm.

4. The polyester film according to claim 1, wherein the titanium oxide particles contained in the base film have an average particle size of 0.1 μm to 0.3 μm.

5. The polyester film according to claim 1, wherein the image receiving layer contains particles, and an average minor axis of the particles contained in an amount of 40 mass % or greater in the image receiving layer is 0.005 μm to 0.2 μm.

6. The polyester film according to claim 1, wherein the base film has a thickness of 100 μm to 300 μm.

7. The polyester film according to claim 1, wherein an optical density is 0.5 or greater.

8. The polyester film according to claim 1, wherein a whiteness measured from the image receiving layer side is 50% or greater.

9. The polyester film according to claim 1, wherein the image receiving layer has a thickness of 2 μm to 6 μm.

10. The polyester film according to claim 1, which is an image receiving sheet.

11. A method of manufacturing the polyester film of claim 1 comprising the steps of:

forming the base film which is biaxially stretched at least 12 times in area magnification by subjecting an unstretched polyester film containing a polyester and titanium oxide particles and having an intrinsic viscosity of 0.70 dL/g to 0.90 dL/g to longitudinal stretching in a length direction and lateral stretching in a width direction; and forming the image receiving layer by coating at least one surface of the obtained base film with a coating liquid for forming the image receiving layer.

* * * * *